US012372624B2

(12) United States Patent
Watson et al.

(10) Patent No.: US 12,372,624 B2
(45) Date of Patent: Jul. 29, 2025

(54) OPTICAL SENSOR FOR MIRROR ZERO ANGLE IN A SCANNING LIDAR

(71) Applicant: Waymo LLC, Mountain View, CA (US)

(72) Inventors: Jason Watson, San Jose, CA (US); Gregory Hall, Woodside, CA (US); Blaise Gassend, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 1163 days.

(21) Appl. No.: 17/211,292

(22) Filed: Mar. 24, 2021

(65) Prior Publication Data

US 2022/0308175 A1    Sep. 29, 2022

(51) Int. Cl.
     *G01S 7/481*      (2006.01)
     *G01S 17/06*      (2006.01)
     *G02B 26/10*      (2006.01)

(52) U.S. Cl.
     CPC .......... *G01S 7/4817* (2013.01); *G01S 7/4813* (2013.01); *G01S 17/06* (2013.01); *G02B 26/105* (2013.01)

(58) Field of Classification Search
     CPC ........ G01S 7/4187; G01S 7/4813; G01S 7/06; G01S 7/4863; G01S 17/10; G01S 17/42;
(Continued)

(56) References Cited

U.S. PATENT DOCUMENTS 4,709,146 A   *   11/1987   Reitsema ................ G01D 5/30
                                                                                             250/237 G
5,131,744 A       7/1992   Kaneko et al.
(Continued)

FOREIGN PATENT DOCUMENTS

CN        110243787      9/2019
JP         6733195 B2      7/2020
(Continued)

OTHER PUBLICATIONS

Nishibori et al., "Measurement of mirror inclination angle and distance using LED light sources and PSD," IECON 2011—37th Annual Conference of the IEEE Industrial Electronics Society; Nov. 7-10, 2011, 4 pages (abstract).
(Continued)

*Primary Examiner* — Joshua D Huson
*Assistant Examiner* — Vicente Rodriguez
(74) *Attorney, Agent, or Firm* — McDonnell Boehnen Hulbert & Berghoff LLP

(57) ABSTRACT

The present disclosure relates to systems and methods that provide an accurate angle measurement of a rotatable mirror. An example method includes receiving, from a detector device, a reflected light signal. The reflected light signal is indicative of primary reflection light and secondary reflection light. The primary reflection light corresponds to a first portion of emission light that reflects directly from the reflective surface of the rotatable mirror toward the detector device. The secondary reflection light corresponds to a second portion of emission light that: 1) reflects from the reflective surface of the rotatable mirror toward a secondary mirror surface; 2) reflects from the secondary mirror surface toward the reflective surface of the rotatable mirror; and 3) reflects from the reflective surface of the rotatable mirror toward the detector device. The method also includes determining, based on the reflected light signal, the rotational angle of the rotatable mirror.

20 Claims, 14 Drawing Sheets

(58) Field of Classification Search
CPC ...... G01S 17/86; G01S 17/894; G01S 17/931; G02B 26/105; G02B 26/12
See application file for complete search history.

(56) References Cited

U.S. PATENT DOCUMENTS

| | | | |
|---|---|---|---|
| 6,459,389 | B1 | 10/2002 | Germuth-Löffler et al. |
| 7,209,237 | B2 | 4/2007 | Ok et al. |
| 7,515,256 | B2 | 4/2009 | Ohtomo et al. |
| 7,808,863 | B2 | 10/2010 | Lee |
| 8,184,277 | B2 | 5/2012 | Bove et al. |
| 8,570,502 | B2 | 10/2013 | Richter et al. |
| 8,692,151 | B2 | 4/2014 | Tertitski et al. |
| 8,982,341 | B2 | 3/2015 | Enami |
| 9,006,607 | B2 | 4/2015 | Ueda |
| 9,063,549 | B1 | 6/2015 | Pennecot et al. |
| 9,128,190 | B1* | 9/2015 | Ulrich .................. G02B 26/08 |
| 9,285,464 | B2* | 3/2016 | Pennecot .............. G01S 17/42 |
| 9,450,670 | B1* | 9/2016 | Fleischer .......... H04B 10/1123 |
| 9,933,616 | B2 | 4/2018 | Ueda |
| 10,003,168 | B1 | 6/2018 | Villeneuve |
| 10,649,072 | B2 | 5/2020 | Bozchalooi et al. |
| 10,670,702 | B2 | 6/2020 | Choi et al. |
| 2002/0095618 | A1 | 7/2002 | Orcutt et al. |
| 2003/0053742 | A1 | 3/2003 | Maruyama |
| 2020/0150209 | A1 | 5/2020 | Kirillov |
| 2020/0182975 | A1 | 6/2020 | Wang et al. |
| 2021/0080550 | A1 | 3/2021 | Gassend et al. |
| 2021/0199769 | A1* | 7/2021 | Meylan ................. G01S 7/4811 |
| 2023/0305113 | A1* | 9/2023 | Onda ...................... G01S 17/10 |

FOREIGN PATENT DOCUMENTS

| | | |
|---|---|---|
| KR | 20030083931 A | 11/2003 |
| KR | 20190141345 | 12/2019 |
| WO | 2017/050664 A1 | 3/2017 |

OTHER PUBLICATIONS

Rivas et al., "A Method and Electronic Device to Detect the Optoelectronic Scanning Signal Energy Centre," https://www.intechopen.com/books/optoelectronics-advanced-materials-and-devices/a-method-and-electronic-device-to-detect-the-optoelectronic-scanning-signal-energy-centre, Jan. 16, 2013, 50 pages.

International Searching Authority, International Search Report and Written Opinion mailed on Jun. 2, 2022, issued in connection with International Patent Application No. PCT/US2022/070818 filed on Feb. 24, 2022, 11 pages.

* cited by examiner

OPTICAL SENSOR FOR MIRROR ZERO ANGLE IN A SCANNING LIDAR

BACKGROUND

A conventional Light Detection and Ranging (lidar) system may utilize a light-emitting transmitter (e.g., a laser diode) to emit light pulses into an environment. Emitted light pulses that interact with (e.g., reflect from) objects in the environment can be received by a receiver (e.g., a photodetector) of the lidar system. Range information about the objects in the environment can be determined based on a time difference between an initial time when a light pulse is emitted and a subsequent time when the reflected light pulse is received.

In the case of lidars that direct light pulses by way of a rotatable mirror, some conventional systems may measure the angle of the rotatable mirror using magnetic encoders or optical quadrature encoders. For example, magnetic encoders could be mounted proximate to a rotational axis of the rotatable mirror. Such magnetic encoders can give acceptable performance by providing continuous data indicative of the mirror angle. However, magnetic encoders can be susceptible to shifts that cause inaccurate point cloud information. In some examples involving autonomous vehicles, such inaccuracy can result in system faults when the orientation of the road, as perceived by the lidar sensor, does not match other sensors, e.g. cameras or other lidar sensors.

SUMMARY

The present disclosure generally relates to light detection and ranging (lidar) systems, which may be configured to obtain information about an environment. Such lidar devices may be implemented in vehicles, such as autonomous and semi-autonomous automobiles, trucks, motorcycles, and other types of vehicles that can navigate and move within their respective environments.

In a first aspect, an optical system is provided. The optical system includes a rotatable mirror that is configured to rotate about a rotational axis. The optical system additionally includes a substrate. The optical system also includes a light-emitter device configured to emit emission light along an optical axis, such that the emission light interacts with a reflective surface of the rotatable mirror so as to provide reflected light. The optical system yet further includes a detector device. The light-emitter device and the detector device are disposed along the substrate. The detector device is configured to receive at least a portion of the reflected light. The optical system also includes a cylindrical lens. The light-emitter device and the detector device are optically coupled to the rotatable mirror by way of the cylindrical lens. The detector device is configured to provide a reflected light signal indicative of a rotational angle of the rotatable mirror with respect to the rotational axis.

In a second aspect, a method is provided. The method includes causing a light-emitter device to emit emission light along an optical axis toward a rotatable mirror, such that the emission light interacts with a reflective surface of the rotatable mirror so as to provide reflected light. The rotatable mirror is configured to rotate about a rotational axis. The method also includes receiving, from a detector device, a reflected light signal. The reflected light signal is indicative of primary reflection light and secondary reflection light. The primary reflection light corresponds to a first portion of emission light that reflects directly from the reflective surface of the rotatable mirror toward the detector device. The secondary reflection light corresponds to a second portion of emission light that: 1) reflects from the reflective surface of the rotatable mirror toward a secondary mirror surface; 2) reflects from the secondary mirror surface toward the reflective surface of the rotatable mirror; and 3) reflects from the reflective surface of the rotatable mirror toward the detector device. The method yet further includes determining, based on the reflected light signal, the rotational angle of the rotatable mirror.

Other aspects, embodiments, and implementations will become apparent to those of ordinary skill in the art by reading the following detailed description, with reference where appropriate to the accompanying drawings.

DETAILED DESCRIPTION

Figure 1:
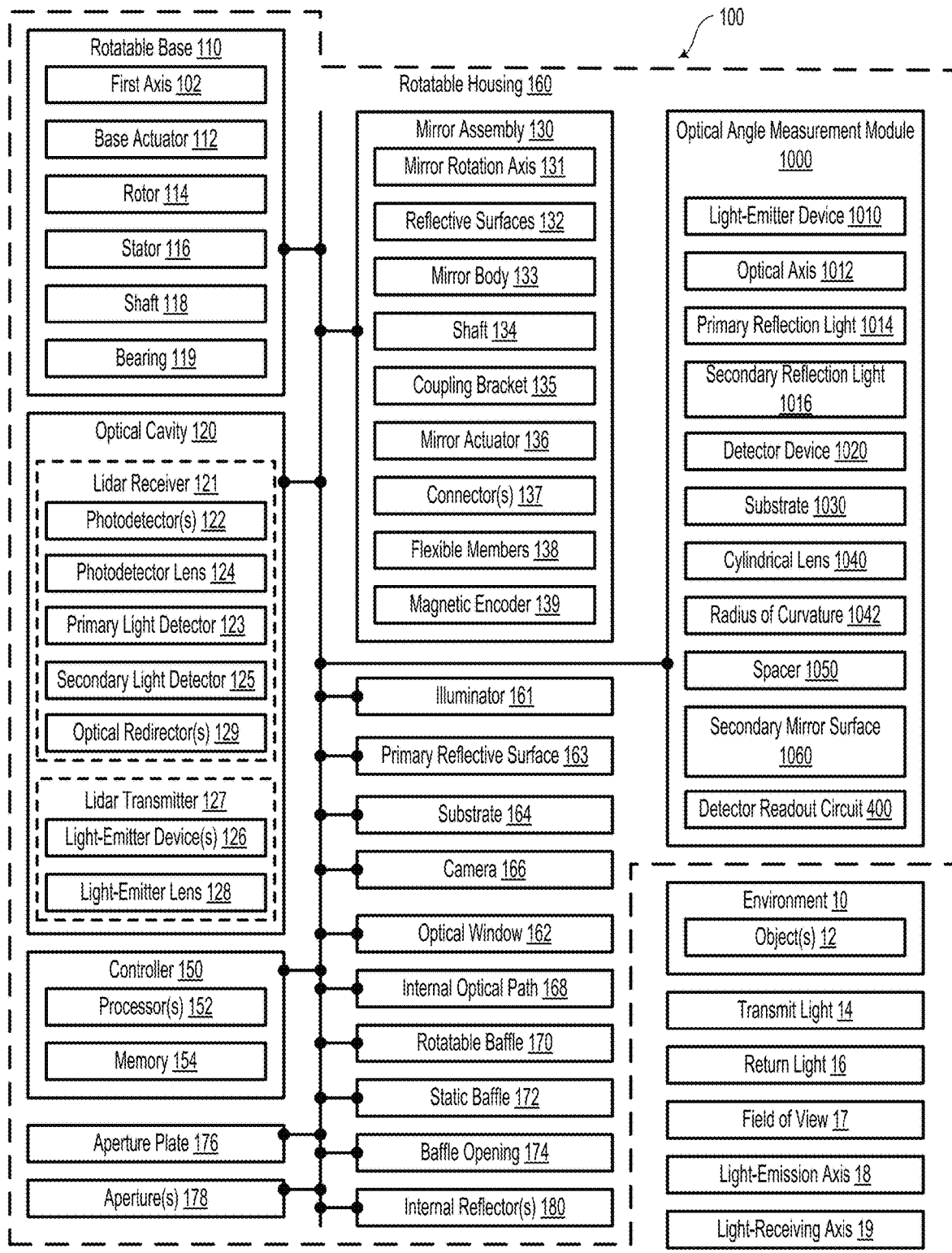
FIG. 1 illustrates an optical system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Optical systems may include a movable (e.g., rotatable) mirror that may adjust a field of view or other adjustable optical aspects of the system. In such scenarios, an accurate measurement of an orientation of the movable mirror can be beneficial when using the optical system. In some examples involving a rotatable mirror of a scanning lidar system, accurately measuring an orientation angle of the rotatable mirror can be important to determining object location, object type, and/or other perception-related tasks.

Conventional lidar systems may measure the angle of the rotatable mirror using magnetic encoders or optical quadrature encoders, which could be mounted proximate to a rotational axis of the rotatable mirror. Such encoders can give acceptable performance by providing continuous data indicative of the mirror angle. However, conventional encoder systems can be susceptible to shifts that cause inaccurate point cloud information. In some examples involving autonomous vehicles, such inaccuracy can result in system faults when the orientation of the road, as perceived by the lidar sensor, does not match other sensors, e.g. cameras or other lidar sensors.

The current disclosure relates to a sensor system that could provide a signal when the rotatable mirror is in a known reference orientation (e.g., at a calibration orientation angle). Such a sensor system may be beneficial to detect and correct for shifts in the magnetic encoder angle data.

The sensor system could include a light-emitter device and a detector that are disposed adjacent to each other along a shared substrate. A spacer could include a baffle configured to prevent emission light from directly entering the detector. As an example, the spacer could include respective cavities through which the light-emitter device and the detector device are optically coupled to the rotatable mirror. In some examples, a cylindrical lens could be coupled to the spacer so as to be disposed along the respective optical paths of the light-emitter device and the detector device.

The light-emitter device could be configured to emit emission light towards the rotatable mirror. When the rotatable mirror is at or near a reference angle, the emission light, which could be collimated, interacts with the mirror so as to reflect back towards the detector. In some embodiments, the emission light beam (e.g., light transmitted toward the rotatable mirror) could be collimated by way of a cylindrical lens. The cylindrical lens could be configured to collimate light in one direction but not in the other direction. In an example embodiment, transmit light could be substantially collimated prior to interacting with the rotatable mirror and the light reflected from the rotatable mirror could diverge slightly and could be collimated by the cylindrical lens prior to interacting with the detector. In some examples, the transmit light beam and the receive light beam could be half-collimated by way of the cylindrical lens. It will be understood that other optical components and/or assemblies are possible and contemplated. For example, other types of lenses (e.g., spherical lenses) are possible.

In scenarios where the rotatable mirror includes a multi-sided prism (e.g., a 3-, 4-, 5-, 6-, or 8-sided prism), a reflected light signal could be received when each mirror face is aligned substantially perpendicular with the respective optical axes of the light-emitter device and detector device.

The sensor system could be constructed by mounting the light-emitter device and detector device on a shared substrate or sub-mount. Next, a spacer with two separate cavities could be placed over the light-emitter device and detector device and attached to the shared substrate. In some embodiments, the spacer could be plastic, although other optically opaque materials are possible and contemplated. A cylindrical lens could be attached to the spacer so as to provide optical power (e.g., converging or diverging power) for light emitted from the light-emitter device and/or received by the detector device. Utilizing a cylindrical lens may beneficially allow the emission light to spread out in one direction, thereby simplifying alignment. In example embodiments, emission light emitted from the light-emitter device could be uncollimated upon emission. However, the emission light could interact with a cylindrical lens so as to provide a highly collimated beam as the light is projected toward the rotatable mirror. In such a scenario, the collimated beam could provide a sharp signal when the surface of the rotatable mirror is perpendicular to the optical sensor. Without the cylindrical lens, the optical signal could include a "peak" with a width of approximately 10 degrees of angle rotation of the rotatable mirror. However, with the cylindrical lens, the optical signal could be much narrower, such as around 1 degree of rotational angle, or less.

However, the reflected light signal may still be sensitive to displacements of the lens, particularly along a direction perpendicular to a line between the light-emitter device and the detector device. This sensitivity can be alleviated by utilizing a double-bounce path, in addition to the primary, single-bounce path. The effects of lens displacement can be calculated by comparing the signals from the two paths, and then removed from the estimate of the mirror orientation.

II. Example Optical Systems

FIG. 1 illustrates an optical system, according to an example embodiment. In some embodiments, the optical system 100 could be a laser-based distance and ranging (lidar) system, or a portion thereof. In such scenarios, the optical system 100 could be configured to emit light pulses into an environment 10 so as to provide information indicative of objects 12 within a field of view 17. As described herein, optical system 100 could be coupled to a vehicle so as to provide information about an external environment of the vehicle.

Optical system 100 includes a rotatable base 110 configured to rotate about a first axis 102. In some embodiments, a base actuator 112 could be operable to rotate the rotatable base 110 about the first axis 102 at an azimuthal rotational rate between 3 Hertz and 60 Hertz (e.g., between 180 revolutions per minute RPM and 3600 RPM). However, other azimuthal rotational rates are possible and contemplated. In some embodiments, the base actuator 112 could be controlled by the controller 150 to rotate at a desired rotational rate. In such scenarios, the controller 150 could control the base actuator 112 to rotate at a single target rotational rate and/or the controller 150 could dynamically adjust a desired rotational rate of the base actuator 112 within a range of possible rotational rates.

In some embodiments, the base actuator 112 could include an electric motor. For example, the electric motor could include a stator 116 and a rotor 114 that could be operable to rotate a shaft 118 of the rotatable base 110. In various embodiments, the base actuator 112 could be a direct current (DC) motor, a brushless motor, or another type of rotational actuator. In some embodiments, the shaft 118 could be coupled to the rotatable base 110 by way of one or more bearings 119. Bearings 119 could include a rotational bearing or another type of low-friction bearing.

In some embodiments, optical system 100 need not include a rotatable base 110. In such scenarios, one or more elements of the optical system 100 within housing 160 may be configured to rotate about the first axis 102. However, in other cases, some elements of the optical system 100 need not rotate about the first axis 102. Accordingly, in such embodiments, optical system 100 could be utilized in line-scanning applications, single-point scan applications, among other possibilities.

The optical system 100 also includes a mirror assembly 130 with shaft 134 and a mirror body 133 that is configured to rotate about a mirror rotation axis 131. In some embodiments, the mirror rotation axis 131 could be substantially perpendicular to the first axis 102 (e.g., within 0 to 10 degrees of perpendicular). In an example embodiment, a mirror actuator 136 could be configured to rotate the mirror body 133 about the mirror rotation axis 131 at a mirror rotational rate between 100 Hz to 1000 Hz (e.g., between 6,000 RPM and 60,000 RPM). In some contexts, the mirror body 133 could be configured to rotate about the mirror rotation axis 131 within a period of rotation (e.g., between 3.3 milliseconds and 1 millisecond).

The mirror actuator 136 could be a DC motor, a brushless DC motor, an AC motor, a stepper motor, a servo motor, or another type of rotational actuator. It will be understood that the mirror actuator 136 could be operated at various rotational speeds or at a desired rotational speed, and that the mirror actuator 136 could be controlled by the controller 150.

In example embodiments, the mirror assembly 130 includes a plurality of reflective surfaces 132. For example, the plurality of reflective surfaces 132 could include four reflective surfaces (e.g., reflective surface 132a, 132b, 132c, and 132d). In various embodiments, the reflective surfaces 132 could be formed from at least one of: gold, silicon oxide, titanium oxide, titanium, platinum, or aluminum. In such scenarios, the four reflective surfaces could be arranged symmetrically about the mirror rotation axis 131 such that a mirror body 133 of the mirror assembly 130 has a rectangular prism shape. It will be understood that the mirror assembly 130 could include more or less than four reflective surfaces. Accordingly, the mirror assembly 130 could be shaped as a multi-sided prism shape having more or less than four sides. For example, the mirror assembly 130 could have three reflective surfaces. In such scenarios, the mirror body 133 could have a triangular cross-section.

In some embodiments, the mirror body 133 could be configured to couple the plurality of reflective surfaces 132 to the shaft 134. In such scenarios, the mirror body 133 could be substantially hollow. In various embodiments, at least a portion of the mirror body 133 could have an octagonal cross-section and/or a four-fold symmetry. In one example, mirror body 133 may include a polycarbonate material. In this example, an octagonal and/or four-fold symmetry configuration for mirror body 133 may facilitate reducing potential slippage of the polycarbonate material of the mirror body 133 on the shaft 134 during rotation of the mirror body. Other examples are possible as well.

In some embodiments, the mirror body 133 could include a plurality of flexible support members 138. In such scenarios, at least one flexible support member 138 could be straight. Additionally or alternatively, at least one flexible support member 138 could be curved. In some embodiments, based on a geometry of the system of flexible support members, the mirror body 133 could be stiff in some directions (e.g., to transfer load) and elastic in some directions to accommodate thermal expansion. For example, the flexible support members 138 could be configured to be substantially stiff when in torsion and substantially elastic in response to forces perpendicular to the rotational axis. In various embodiments, the mirror body 133 could be formed from an injection molded material, such as a plastic material. Furthermore, the shaft 134 could be formed from steel or another structural material.

In such scenarios, the mirror assembly 130 could include a magnetic encoder 139, which could be coupled to the shaft 134. In such scenarios, the magnetic encoder 139 is configured to provide information indicative of a rotational position of the rotatable mirror assembly 130 with respect to the transmitter 127 and the receiver 121.

In some embodiments, magnetic encoder 139 may also be configured as a mirror motor magnet (e.g., included in mirror actuator 136). In these embodiments, optical system 100 may use the magnetic encoder 139 to facilitate both measuring and adjusting the rotational position of the rotatable mirror assembly 130. In one example embodiment, magnetic encoder 139 may be one of a plurality of magnets (e.g., magnet ring, etc.) disposed in a circular arrangement and configured to interact with a magnetic field (e.g., generated at actuator 136) to cause the rotation of the mirror assembly. Other embodiments are possible.

In various examples, the mirror assembly 130 could additionally or alternatively include a coupling bracket 135 configured to couple at least a portion of the mirror assembly 130 to the other elements of optical system 100, such as housing 160. The coupling bracket 135 could be configured to attach the mirror assembly 130 to the housing 160 by way of one or more connectors 137. In such scenarios, the coupling bracket 135 and the connectors 137 could be configured to be easily removable from other elements of the optical system 100. Such ease of removability could provide better recalibration, service, and/or repair options.

The optical system 100 additionally includes an optical cavity 120 coupled to the rotatable base 110. The optical cavity includes a transmitter 127 having at least one light-emitter device 126 and a light-emitter lens 128. In example embodiments, the at least one light-emitter device 126 could include one or more laser diodes. Other types of light sources are possible and contemplated. The at least one light-emitter device 126 and the light-emitter lens 128 are arranged so as to define a light-emission axis 18.

In various embodiments, the rotatable mirror assembly 130 could be configured to controllably rotate about the mirror rotation axis 131 so as to transmit emission light toward, and receive return light from, locations within the environment 10.

The optical cavity 120 also includes a receiver 121 configured to detect return light 16 from the environment 10. In various embodiments, the receiver 121 could include a bandpass filter configured to transmit light within a predetermined wavelength band (e.g., infrared light between 800-1600 nanometers). The receiver 121 includes a plurality of photodetectors 122. As an example, the plurality of photodetectors 122 could include at least one solid-state single-photon-sensitive device. For example, in some embodiments, the plurality of photodetectors 122 could include one or more silicon photomultipliers (SiPMs). In such scenarios, the SiPMs could each include a plurality (e.g., a two-dimensional array) of single-photon avalanche diodes (SPADs). Additionally or alternatively, the plurality of photodetectors 122 could include an avalanche photodiode (APD), an infrared photodiode, photoconductor, a PIN diode, or another type of photodetector. Additionally, it will be understood that systems incorporating multiple photodetectors, such as a focal plane array or another type of image sensor, are also possible and contemplated.

The plurality of photodetectors 122 includes a respective set of two or more photodetectors for each light-emitter device of the at least one light-emitter device 126. In various embodiments, the at least one light-emitter device 126 could be configured to emit light pulses that interact with the mirror assembly 130 such that the light pulses are redirected toward an environment 10 of the optical system 100 as transmit light 14. In such scenarios, at least a portion of the light pulses could be reflected back toward the optical system 100 as return light 16 and received by the plurality of photodetectors 122 so as to determine at least one of: a time of flight, a range to an object 12, and/or a point cloud.

In example embodiments, the photodetectors 122 could provide an output signal to the controller 150. For example, the output signal could include information that can be used to calculate or is otherwise indicative of a time of flight of a given light pulse toward a given portion of the field of view 17 of the environment 10. Additionally or alternatively, the output signal could include information indicative of other properties of the object from which it reflected, e.g., reflectivity, and/or information that can be used to determine or is otherwise indicative of at least a portion of a range map or point cloud of the environment 10.

In some embodiments, each set of two or more photodetectors could include a primary light detector 123 and a secondary light detector 125. The primary light detector 123 is configured to receive a first portion of return light 16 corresponding to light pulses emitted from a given light-emitter device. In such scenarios, the secondary light detector 125 is configured to receive a second portion of return light emitted from the given light-emitter device.

In various embodiments, the first portion of the return light 16 and the second portion of the return light 16 could have widely different intensities. For example, the first portion of the return light 16 could be at least an order of magnitude greater in photon flux than the second portion of the return light 16.

In an example embodiment, the at least one light-emitter device 126 could include a four-element laser diode bar (e.g., four discrete light sources disposed on a laser bar). In such scenarios, the plurality of photodetectors 122 could include four primary light detectors (e.g., primary light detector 123a, 123b, 123c, and 123d). Each primary light detector could correspond to a respective light-emitter on the laser diode bar. Additionally, the plurality of photodetectors 122 could include four secondary light detectors (e.g., second light detector 125a, 125b, 125c, and 125d). Each secondary light detector could correspond to a respective light-emitter on the laser diode bar.

In alternate embodiments, the at least one light-emitter device 126 may include two or more laser diode bars, and a laser bar may include more or fewer than four light-emitter devices.

In some embodiments, the light-emitter device 126 could be coupled to a laser pulser circuit operable to cause the light-emitter device 126 to emit one or more laser light pulses. In such scenarios, the laser pulser circuit could be coupled to a trigger source, which could include controller 150. The light-emitter device 126 could be configured to emit infrared light (e.g., light having a wavelength between 800-1600 nanometers (nm), such as 905 nm). However, other wavelengths of light are possible and contemplated.

The receiver 121 also includes a photodetector lens 124. The plurality of photodetectors 122 and the photodetector lens 124 are arranged so as to define a light-receiving axis 19.

The receiver 121 additionally includes a plurality of apertures 178, which may be openings in an aperture plate 176. In various embodiments, the aperture plate 176 could have a thickness between 50 microns and 200 microns. Additionally or alternatively, at least one aperture of the plurality of apertures 178 may have a diameter between 150 microns and 300 microns. However, other aperture sizes, larger and smaller than this range, are possible and contemplated. Furthermore, in an example embodiment, the respective apertures of the plurality of apertures 178 could be spaced apart by between 200 microns and 800 microns. Other aperture spacings are possible and contemplated.

The receiver 121 could also include one or more optical redirectors 129. In such a scenario, each optical redirector 129 could be configured to optically couple a respective portion of return light 16 from a respective aperture to at least one photodetector of the plurality of photodetectors 122. For example, each optical redirector could be configured to optically couple a respective portion of return light from a respective aperture to at least one photodetector of the plurality of photodetectors by total internal reflection.

In some embodiments, the optical redirectors 129 could be formed from an injection-moldable optical material. In such scenarios, the optical redirectors 129 are coupled together in element pairs such that a first element pair and a second element pair are shaped to slidably couple with one another. In example embodiments, the optical redirectors 129 are configured to separate the return light 16 into unequal portions so as to illuminate a first photodetector with a first photon flux of a first portion of the return light 16 and illuminate a second photodetector with a second photon flux of a second portion of the return light 16. In some embodiments, one or more surfaces of the optical redirectors 129 could be coated or shaped so as to suppress or eliminate cross-talk between receiver channels. As an example, one or more surfaces of the optical redirectors 129 could be coated with an opaque optical material configured to suppress or eliminate cross-talk between receiver channels.

In some examples, the optical redirectors 129 may also be configured to expand a beam width of the first portion of the return light 16 projected onto the first photodetector (and/or the second portion of the return light 16 projected onto the second photodetector). In this way, for example, detection area(s) at the respective photodetectors on which respective portion(s) of return light 16 are projected may be greater than the cross-sectional areas of their associated apertures.

In various example embodiments, the rotatable base 110, the mirror assembly 130, and the optical cavity 120 could be disposed so as to provide a field of view 17. In some embodiments, the field of view 17 could include an azimuthal angle range of 360 degrees about the first axis 102 and an elevation angle range of between 60 degrees and 120 degrees (e.g., at least 100 degrees) about the mirror rotation axis 131. In one embodiment, the elevation angle range could be configured to allow optical system 100 to direct one or more emitted beams along the direction (and/or substantially parallel to) the first axis 102. It will be understood the other azimuthal angle ranges and elevation angle ranges are possible and contemplated.

In some embodiments, the field of view 17 could have two or more continuous angle ranges (e.g., a "split" field of view or a discontinuous field of view). In one embodiment, the two or more continuous angle ranges may extend away from a same side of the first axis 102. Alternatively, in another embodiment, the two or more continuous angle ranges may extend away from opposite sides of the first axis 102. For example, a first side of the first axis 102 may be associated with elevation angles between 0 degrees and 180 degrees, and a second side of the first axis may be associated with elevation angles between 180 degrees and 360 degrees.

In some embodiments, the optical system 100 includes a rotatable housing 160 having an optical window 162. The optical window 162 could include a flat window. Additionally or alternatively, the optical window 162 could include a curved window and/or a window with refractive optical power. As an example, the curved window could provide an extended field of view (compared to a flat optical window) in exchange for some loss or degradation in the quality of the optical beam. In such scenarios, the light pulses could be emitted toward, transmitted through, and received from, the environment 10 through the optical window 162. Furthermore, although one optical window is described in various embodiments herein, it will be understood that examples with more than one optical window are possible and contemplated.

The optical window 162 could be substantially transparent to light having wavelengths such as those of the emitted light pulses (e.g., infrared wavelengths). For example, the optical window 162 could include optically transparent materials configured to transmit the emitted light pulses with a transmission efficiency greater than 80% in the infrared wavelength range. In one embodiment, the transmission efficiency of the optical window 162 may be greater than or equal to 98%. In another embodiment, the transmission efficiency of the optical window 162 may vary depending on the angles-of-incidence of the transmit and/or receive light incident on the optical window 162. For instance, the transmission efficiency may be lower when light is incident on the optical window from relatively higher angles-of-incidence than when the light is incident from relatively lower angles-of-incidence.

In some examples, the optical window 162 could be formed from a polymeric material (e.g., polycarbonate, acrylic, etc.), glass, quartz, or sapphire. It will be understood that other optical materials that are substantially transparent to infrared light are possible and contemplated.

In some embodiments, other portions of the rotatable housing 160 could be coated with, or be formed from, an optically absorptive material such as black tape, absorptive paint, carbon black, black anodization, micro-arc oxidation treated surface or material, and/or another type of optically absorptive, anti-reflective surface or material.

The various elements of optical system 100 could be disposed in different arrangements. For example, in an example embodiment, at least one of the light-receiving axis 19 or the light-emission axis 18 does not intersect the mirror rotation axis 131.

The optical system 100 includes a controller 150. In some embodiments, the controller 150 includes at least one of a field-programmable gate array (FPGA) or an application-specific integrated circuit (ASIC). Additionally or alternatively, the controller 150 may include one or more processors 152 and a memory 154. The one or more processors 152 may include a general-purpose processor or a special-purpose processor (e.g., digital signal processors, graphics processor units, etc.). The one or more processors 152 may be configured to execute computer-readable program instructions that are stored in the memory 154. As such, the one or more processors 152 may execute the program instructions to provide at least some of the functionality and operations described herein.

The memory 154 may include, or take the form of, one or more computer-readable storage media that may be read or accessed by the one or more processors 152. The one or more computer-readable storage media can include volatile and/or non-volatile storage components, such as optical, magnetic, organic, or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of optical system 100. As such, the memory 154 may include program instructions to perform or facilitate some or all of the operations or functionalities described herein.

For example, the operations could include causing the light-emitter device 126 to emit the light pulses. In such scenarios, the controller 150 could cause a pulser circuit associated with light-emitter device 126 to provide one or more current/voltage pulses to the light-emitter device 126, which may cause the light-emitter device 126 to provide the light pulses.

The operations could also include receiving at least a first portion of reflected light pulses (e.g., return light 16) from the field of view 17 as a detected light signal. For example, at least some of the light pulses emitted from the light-emitter device 126 via the optical window 162 (e.g., transmit light 14) could interact with objects 12 in the environment 10 in the field of view 17 so as to provide reflected light pulses or return light 16. At least the portion of the reflected light pulses could be received by at least one photodetector of the plurality of photodetectors 122. In turn, the given photodetector could provide a detected light signal, which could include a photocurrent signal or a photovoltage signal.

Furthermore, the operations could include determining, based on the detected light signal, a point cloud indicative of objects 12 within the field of view 17. In an example embodiment, determining the point cloud could be performed by controller 150. For example, the controller 150 could determine and accumulate a plurality of spatial points based on a respective time of flight for each light pulse emitted and received. Determining the point cloud could be further based on an elevation angle of the mirror assembly 130 and an azimuthal angle of the rotatable base 110.

It will be understood that some or all of the operations described herein could be carried out by computing devices located remotely from the controller 150 and/or other elements of optical system 100.

In various embodiments, the optical system 100 could include at least one baffle. For example, the optical system 100 could include at least one rotatable baffle 170 and/or at least one static baffle 172. In such scenarios, the at least one rotatable baffle 170 and/or at least one static baffle 172 could be configured to reduce stray light within the optical cavity 120 (e.g., light traveling internally from the light-emitter device 126 to the plurality of photodetectors 122 without first interacting with the environment around the optical system 100). In an example embodiment, the static baffle 172 could include an optically-opaque material disposed between the light-receiving axis 19 and the light-emission axis 18. In some embodiments, the rotatable baffle 170 could be coupled to the mirror body 133 and could also include an optically-opaque material configured to reduce or eliminate stray light between the transmitter portions and the receiver portions of the optical system 100. In other words, a first portion of the mirror body 133 and a second portion of the mirror body 133 could be separated by the rotatable baffle 170. In such scenarios, the rotatable baffle 170 could be shaped like a flat disk, however other shapes are contemplated and possible. The rotatable baffle 170 could be centered about, and perpendicular to, the mirror rotation axis 131.

In some embodiments, the optical system 100 could include an optical feedback system. As a part of the optical feedback system, the transmitter 127 could be configured to transmit, during the period of rotation of the mirror body 133, a plurality of light pulses toward the reflective surfaces 132 of the mirror assembly 130. In such a scenario, the mirror assembly 130 could be configured to (i) reflect at least a first light pulse of the plurality of light pulses into an environment 10 of the optical system 100 and (ii) reflect at least a second light pulse of the plurality of light pulses into an internal optical path 168. In some embodiments, the internal optical path 168 may include a baffle opening 174 in the rotatable baffle 170, the static baffle 172, and/or in a gap between the rotatable baffle 170 and the static baffle 172.

In such scenarios, the plurality of photodetectors 122 of the receiver 121 could be configured to (i) detect a reflected light pulse including a reflection of the first light pulse caused by an object 12 in the environment 10 and (ii) detect the second light pulse received via the internal optical path 168. In various embodiments, the internal optical path 168 could be defined at least in part by one or more internal reflectors 180 that reflect the second light pulse toward the reflective surfaces 132 of the mirror assembly 130 such that the reflective surfaces 132 reflect the second light pulse toward the receiver 121. In some embodiments, the internal reflectors 180 could include an internal surface of the housing 160 or a surface of another element of the optical system 100. Such surfaces could be coated with a reflective, absorptive, and/or rough coating.

Furthermore, in such scenarios, the controller 150 could be configured to determine a distance to the object 12 in the environment 10 based on a time when the first light pulse is transmitted by the transmitter 127, a time when the first light pulse is detected by the photodetector 122, a time when the second light pulse is emitted/transmitted by the transmitter 127, and a time when the second light pulse is detected by the photodetector 122. In such scenarios, a first light pulse (and its corresponding reflected light pulse) could provide information indicative of a distance to an object and a second light pulse (and its corresponding reflected light pulse) could provide information indicative of a feedback distance or zero-length reference.

An occlusion detection system of optical system 100 could include a primary reflective surface 163. In some embodiments, the primary reflective surface 163 could include a rectangular mirror with an aspect ratio of at least 8:1. However, it will be understood that other shapes of the primary reflective surface 163 are contemplated and possible within the context of the present disclosure. In example embodiments, the primary reflective surface 163 could include a long axis that is disposed substantially parallel to the mirror rotation axis 131.

In such a scenario, the reflective surfaces 132 of the mirror body 133 could represent a plurality of secondary reflective surfaces. Optical system 100 could also include a camera 166. The camera 166 is configured to capture at least one image of an optical element (e.g., the optical window 162) by way of the primary reflective surface 163 and at least one secondary reflective surface of the mirror body 133.

In such scenarios, the controller 150 may be configured to carry out further operations relating to occlusion detection. Such operations could include causing the camera 166 to capture a plurality of images of the optical element by way of the primary reflective surface 163 and at least one secondary reflective surface of the mirror body 133. Each image of the plurality of images is captured at a corresponding mirror angle of the at least one secondary reflective surface.

The optical system 100 additionally includes an illuminator 161. In some embodiments, the illuminator 161 could include an infrared light-emitting diode (LED). In such scenarios, the operations of the controller 150 could additionally include while causing the camera 166 to capture the plurality of images, causing the illuminator 161 to emit light to illuminate the optical element by way of the primary reflective surface 163 and at least one secondary reflective surface of the mirror body 133.

The operations may additionally include determining an aggregate image of the optical element based on the plurality of images and the corresponding mirror angles of the at least one secondary reflective surface.

Additionally or alternatively, the operations could include determining, based on the aggregate image, that at least one occlusion object is present on the optical element.

In some embodiments, the camera includes a fixed focal length lens configured to focus on the optical element by way of the primary reflective surface and the at least one secondary reflective surface. As an example, the camera could include a video capture device.

In examples embodiments, the optical system 100 could include an optical angle measurement module 1000. As described herein, the optical angle measurement module 1000 could be operable to provide information indicative of an orientation angle of the rotatable mirror (e.g., mirror assembly 130). As an example, such information can be utilized to more-accurately determine an elevation angle of light pulses transmitted to and received from an environment of the optical system 100. Additionally or alternatively, such information could be used to confirm and/or compensate for mirror angle information obtained from other sensors, such as a magnetic encoder.

The optical angle measurement module 1000 includes a substrate 1030 and a light-emitter device 1010 configured to emit emission light along optical axis 1012, such that the emission light interacts with a reflective surface 132 of the mirror assembly 130 so as to provide reflected light.

In some embodiments, the light-emitter device 1010 could include a single mode vertical cavity surface emitting laser (VCSEL). As an example, the single mode VCSEL could include a semiconductor laser diode configured to emit laser light along an axis perpendicular from a surface of the substrate 1030. Additionally or alternatively, the light-emitter device 1010 could be another type of light source, such as a light-emitting diode or an edge-emitting diode laser bar.

In some examples, the light-emitter device 1010 could be driven by way of circuitry configured to adjust the electrical and/or optical power of the emitted laser light based on the temperature of an environment of the optical system 100. In such scenarios, the light emitted from light-emitter device

1010 may be regulated or controlled so as to provide predictable and reliable operation over a wide range of operating temperatures.

The optical angle measurement module 1000 also includes a detector device 1020. In example embodiments, the light-emitter device 1010 and the detector device 1020 are disposed along the substrate 1030. For example, the substrate 1030 could include a printed circuit board and the detector device 1020 and the light-emitter device 1010 could be disposed along a surface of the printed circuit board. The detector device 1020 is configured to receive at least a portion of the reflected light (e.g., primary reflection light 1014 and/or secondary reflection light 1016).

In various embodiments, the detector device 1020 could include a silicon PIN photodiode. It will be understood that other types of photodetectors are possible and contemplated, such as charge-coupled devices (CCD)-type and/or complementary metal-oxide semiconductor (CMOS)-type detectors and/or image sensors.

The optical system 100 additionally includes a cylindrical lens 1040. As an example, cylindrical lens 1040 could be an optical lens configured to focus light substantially into a line and/or substantially collimate a divergent light-source. For example, the cylindrical lens 1040 could be configured to collimate the emission light and focus the reflected light.

In various embodiments, the cylindrical lens 1040 could include a curved surface with a radius of curvature of between 1.5 mm to 2.5 mm. Other radii of curvature are also possible and contemplated. In some examples, the cylindrical lens 1040 could be formed from glass, polycarbonate, and/or another engineered plastic material.

The light-emitter device 1010 and the detector device 1020 are optically coupled to the rotatable mirror and corresponding reflective surfaces 132 by way of the cylindrical lens 1040. In various embodiments, the detector device 1020 is configured to provide a reflected light signal (e.g., reflected light signal 252 and/or reflected light signal 256, etc.) indicative of a rotational angle of the rotatable mirror and corresponding reflective surfaces 132 with respect to the rotational axis (e.g., mirror rotation axis 131).

In some embodiments, the optical system 100 could include a spacer 1050. In various examples, the spacer 1050 could include a rectangular cavity with openings along a first surface of the spacer 1050 and an opposing second surface of the spacer 1050. In such scenarios, the spacer 1050 includes a light-emitter cavity 1052 and a detector cavity 1054. Yet further, in some embodiments, the spacer 1050 could be coupled to the substrate 1030 and the cylindrical lens 1040.

In some embodiments, the light reflected from the reflective surface 132 could include primary reflection light 1014. In such scenarios, the primary reflection light 1014 corresponds to a first portion of emission light emitted by the light-emitter device 1010, which reflects directly from the reflective surface 132 of the rotatable mirror toward the detector device 1020.

In examples, the optical system 100 could additionally include a secondary mirror surface 1060 that is disposed on the cylindrical lens 1040. In such scenarios, the reflected light could additionally include secondary reflection light 1016. Various examples could provide that the secondary reflection light 1016 corresponds to a second portion of emission light that: 1) reflects from a reflective surface 132 of the rotatable mirror toward the secondary mirror surface 1060; 2) reflects from the secondary mirror surface 1060 toward the reflective surface 132 of the rotatable mirror; and 3) reflects from the reflective surface 132 of the rotatable mirror toward the detector device 1020.

In such scenarios, the controller 150 could also be configured to carry out other operations such as receiving, from the detector device 1020, the reflected light signal (e.g., reflected light signal 240). In such scenarios, the reflected light signal could be indicative of the primary reflection light 1014 and the secondary reflection light 1016.

The operations could additionally or alternatively include determining, based on the reflected light signal, the rotational angle of the rotatable mirror.

Additionally or alternatively, some examples could include determining, based on the reflected light signal, a lens offset. In such scenarios, determining the rotational angle of the rotatable mirror could be further based on the lens offset.

In some examples, the secondary mirror surface 1060 could be tilted at a tilt angle between 10 degrees to 20 degrees with respect to a plane perpendicular to the optical axis 1012. In such scenarios, the reflected light signal could include a primary reflection peak (e.g., primary reflection peak 332) and a secondary reflection peak (e.g., secondary reflection peak 334). Yet further, in such examples, determining the lens offset could be further based on a mean angle difference 336 between the primary reflection peak and the secondary reflection peak.

In some examples, the operations could include receiving, from a magnetic encoder (e.g., magnetic encoder 139), a magnetic encoder angle corresponding to the rotatable mirror. In such scenarios, the operations could also include comparing the magnetic encoder angle to the rotational angle determined by way of the optical angle measurement module 1000. In such scenarios, the comparison could provide a corrected rotational angle. Additionally or alternatively, based on the comparison, the operations could also include performing at least one of: averaging the magnetic encoder angle and the rotational angle so as to provide a corrected rotational angle, or determining an angle measurement fault. For example, the corrected rotational angle could include a static or dynamic value by which the mirror angle could be adjusted. In various examples, the comparison could be performed by a Kalman filter.

In some examples, the optical system 100 could include a detector readout circuit 400. Detector readout circuit 400 is described more fully in reference to FIG. 4.

Figure 2A:
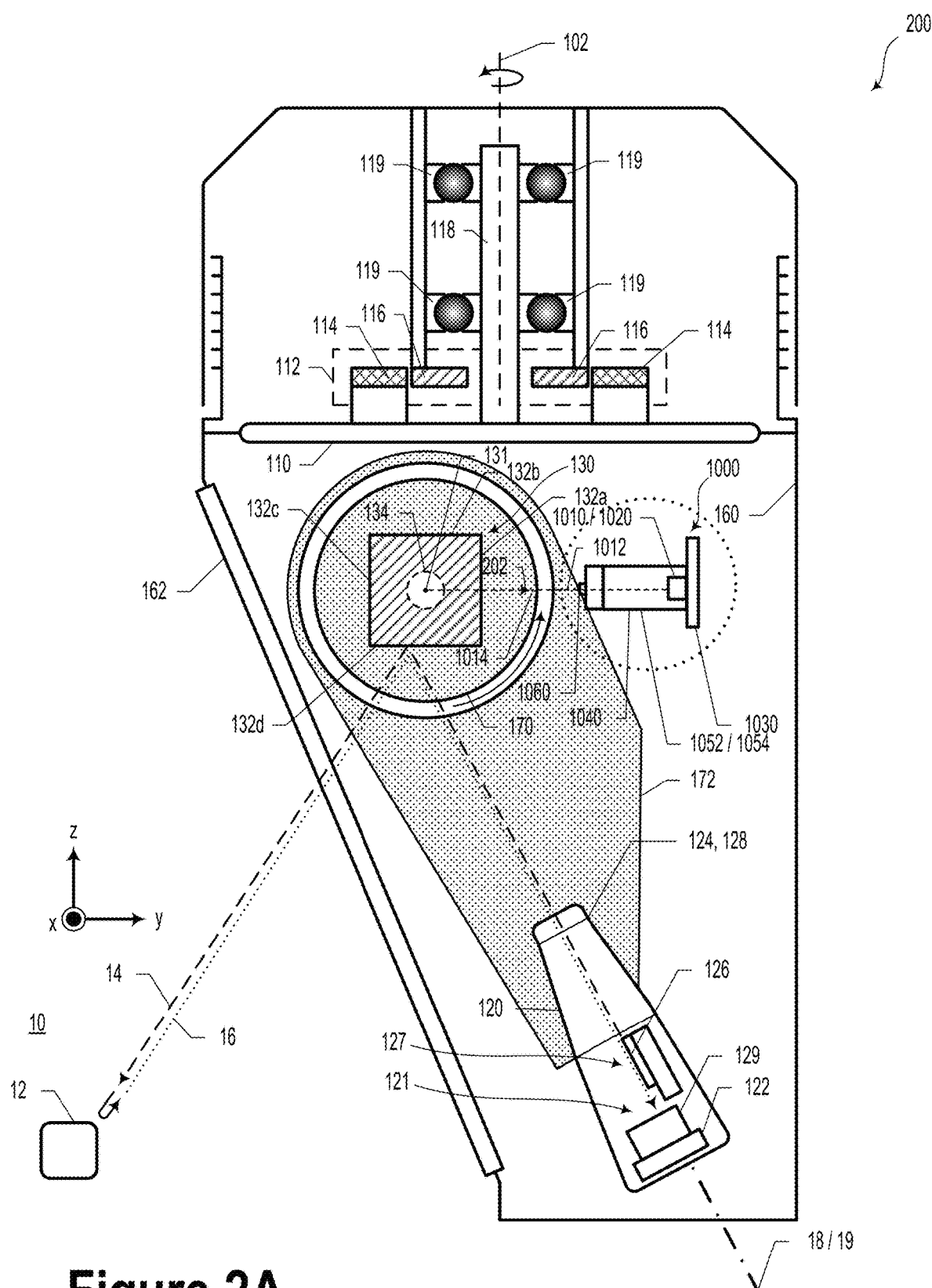
FIG. 2A illustrates the optical system of FIG. 1, according to an example embodiment.

FIG. 2A illustrates the optical system 100 of FIG. 1, according to an example embodiment 200. For example, embodiment 200 could include a rotatable base 110. The rotatable base 110 could be configured to rotate about first axis 102. Furthermore, system 200 could include an optical cavity 120, which could include light-emitter device 126, light-emitter lens 128, photodetector 122, and photodetector lens 124. Furthermore, in some embodiments, system 200 could include a mirror assembly 130. The mirror assembly 130 could include a plurality of reflective surfaces 132a, 132b, 132c, 132d, and a shaft 134. The mirror assembly 130 could be configured to rotate about a mirror rotation axis 131.

In some embodiments, the light-emitter device 126 and the light-emitter lens 128 could form a light-emission axis 18. As illustrated in FIG. 2A, light pulses emitted by the light-emitter device 126 could interact with reflective surface 132d so as to be reflected toward the optical window 162 and transmitted toward the object 12 in the environment 10.

In some embodiments, the photodetector 122 and the photodetector lens 124 could form a light-receiving axis 19.

Light pulses emitted by the light-emitter device 126 could be reflected or otherwise interact with the environment and could be received as return light 16 by way of the reflective surfaces 132 (e.g., reflective surface 132d) and observed at the plurality of photodetectors 122 by way of one or more optical redirectors 129.

As illustrated in FIG. 2A, embodiment 200 could include an optical angle measurement module 1000. For example, the optical angle measurement module could include a light-emitter device 1010 (e.g., a light-emitting diode, a laser diode, etc.), which could be configured to emit light substantially along an optical axis 1012 toward the reflective surfaces 132 of the mirror assembly 130.

Embodiment 200 could include a spacer 1050, which could include two optically-isolated cavities, which could include light-emitter cavity 1052 and detector cavity 1054.

Figure 2B:
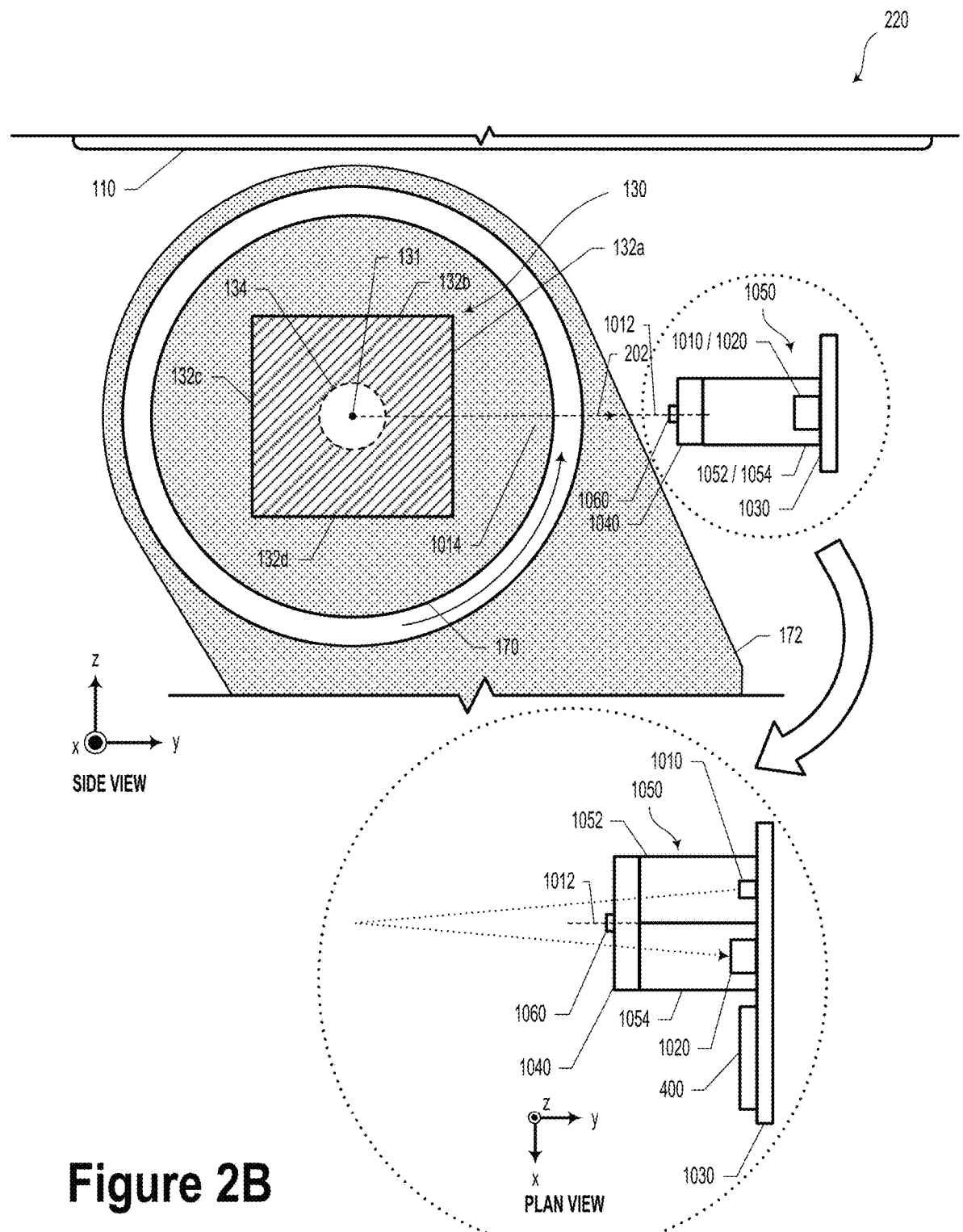
FIG. 2B illustrates the optical system of FIG. 1, according to an example embodiment.

FIG. 2B illustrates a view 220 of the optical system 100 of FIG. 1, according to an example embodiment. View 220 is a close-up partial view of the optical system 100. In some examples, the rotational angle could correspond to an orientation 202 of the rotatable mirror such that the reflective surface 132a of the rotatable mirror is perpendicular to the optical axis 1012. In such scenarios, the optical angle measurement module 1000 could be configured to provide a reflected light signal (e.g., reflected light signal 242) when the reflective surfaces 132 are substantially perpendicular to the optical axis 1012.

Figure 2C:
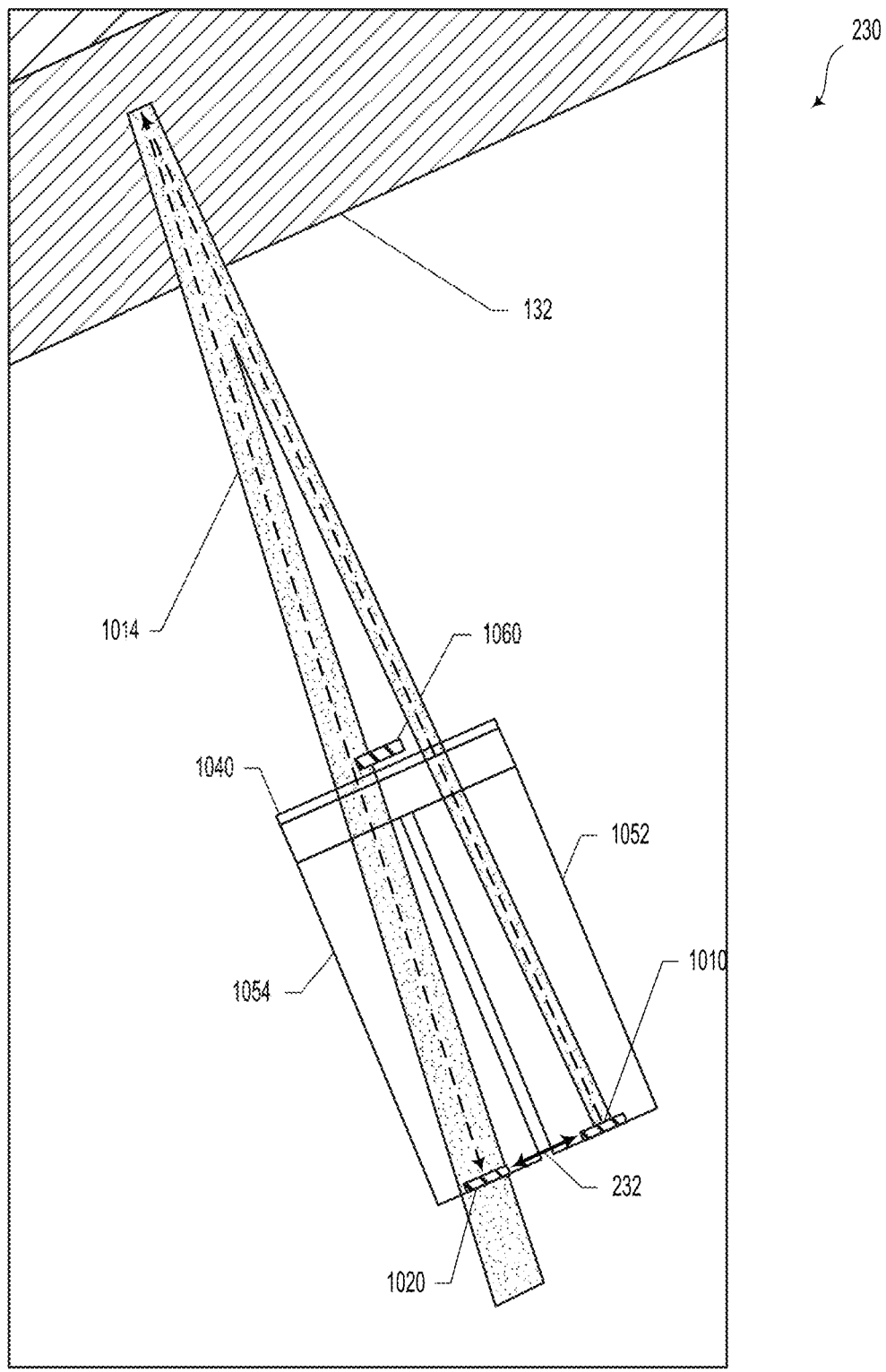
FIG. 2C illustrates a portion of the optical system of FIG. 1, according to an example embodiment.

FIG. 2C illustrates a portion of the optical system 100 of FIG. 1, according to an example embodiment. As illustrated in FIG. 2C, the light-emitter device 1010 and the detector device 1020 could be separated along the substrate 1030 by a separation distance 232 between 0.8 mm to 1.5 mm. Other separation distances are possible and contemplated.

Figure 2D:
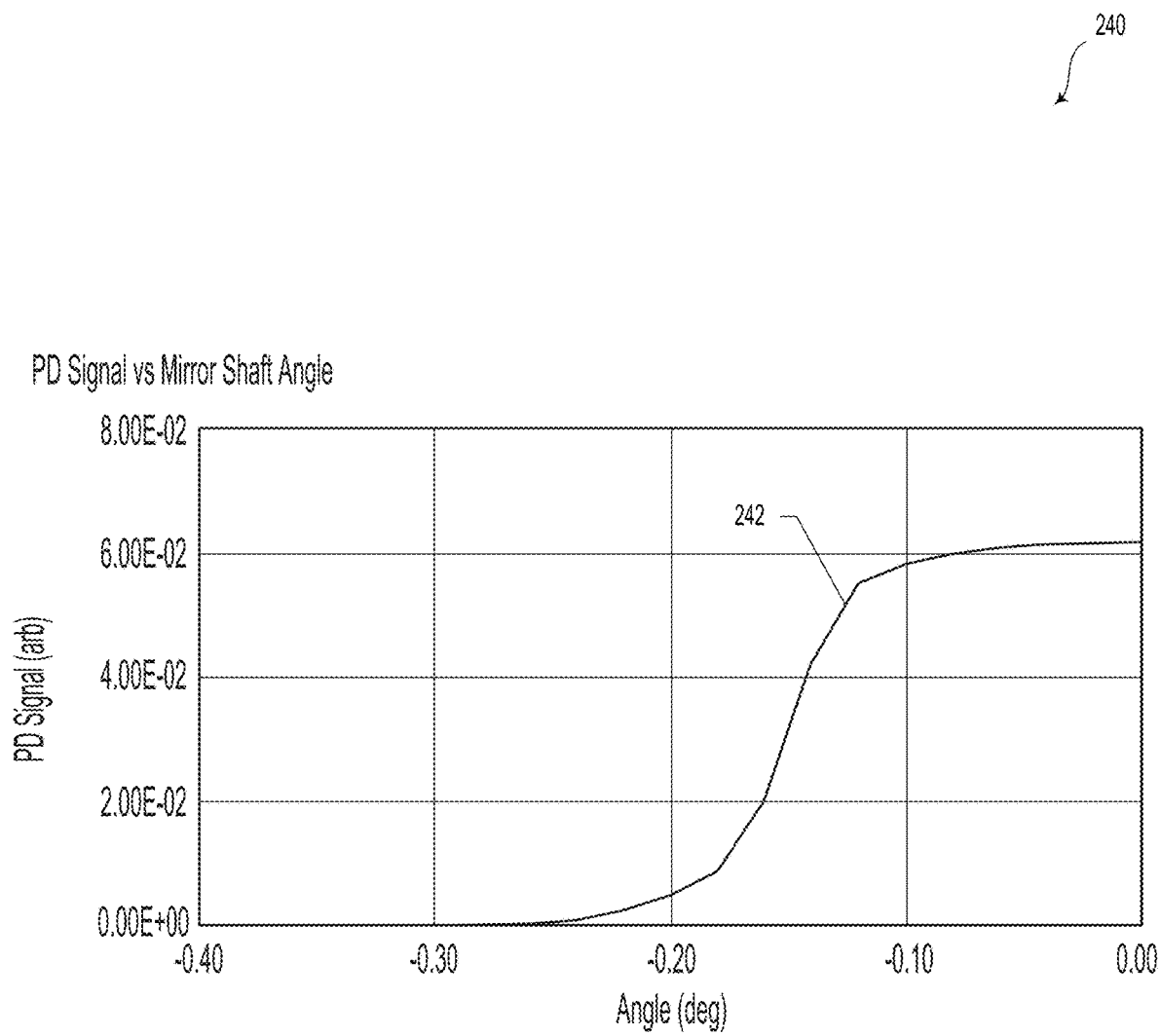
FIG. 2D illustrates a reflected light signal, according to an example embodiment.

FIG. 2D illustrates a reflected light signal 242, according to an example embodiment. In some embodiments, the reflected light signal 242 could be provided by a photodiode (e.g., detector device 1020) associated with the optical angle measurement module 1000. The reflected light signal 242 could be based on the reflective surface 132 rotating to an orientation that is perpendicular to optical axis 1012. As an example, the reflected light signal 242 could reach a peak value while a reflective surface 132 is substantially perpendicular to the optical axis 1012. As the reflective surfaces 132 of the mirror assembly 130 rotate about the mirror rotation axis 131, the reflected light signal 242 may vary (e.g., periodically oscillate) based on a rotational speed of the mirror assembly 130. In such scenarios, monitoring the reflected light signal 242 provides a way to determine the angle of the shaft 134 and/or orientation of the mirror assembly 130 and reflective surfaces 132.

Figure 2E:
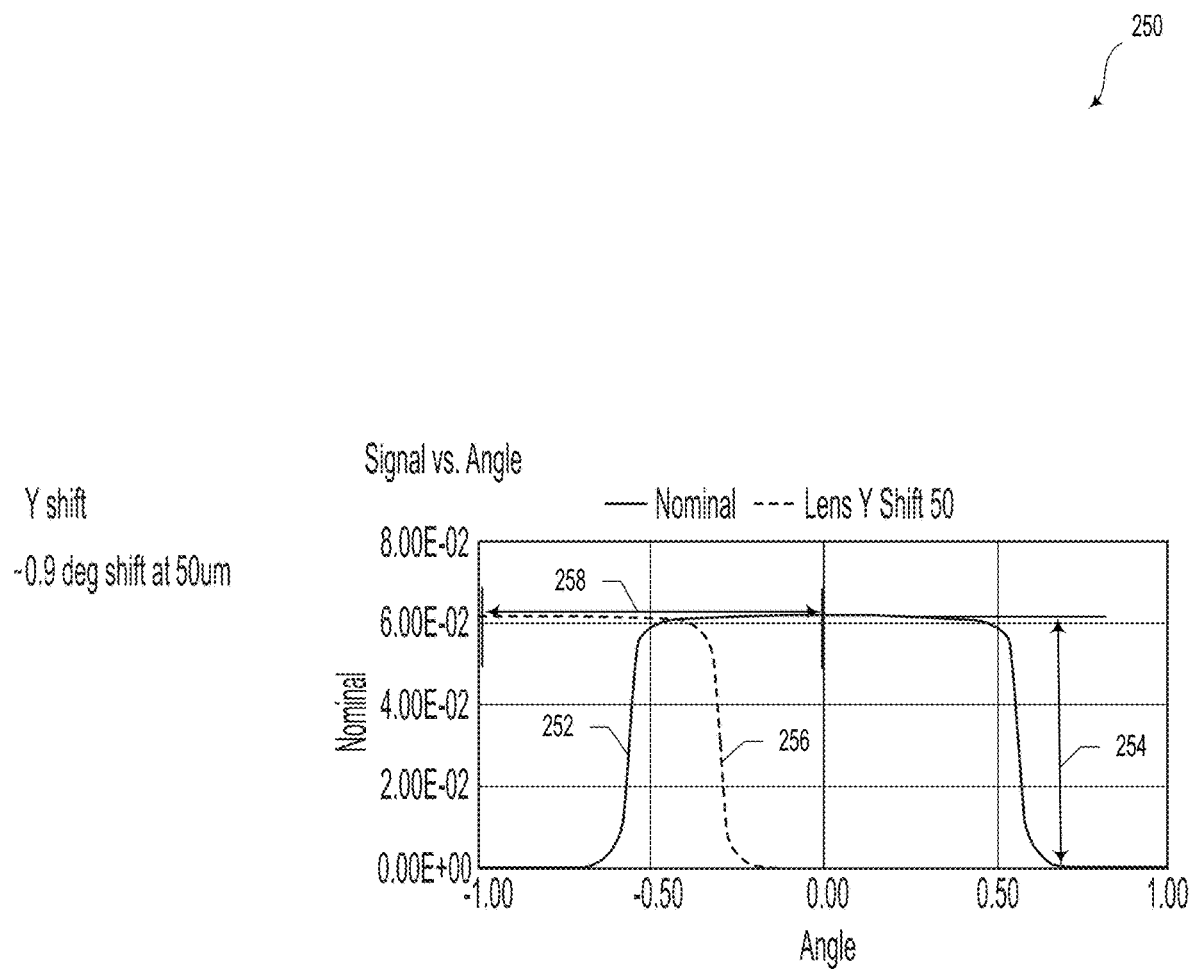
FIG. 2E illustrates reflected light signals, according to an example embodiment.

FIG. 2E illustrates a first reflected light signal 252 and a second reflected light signal 256, according to an example embodiment. The first reflected light signal 252 could be a "nominal" reflected light signal provided, in part, by the cylindrical lens 1040 disposed at a standard y-direction position. The second reflected light signal 256 may be provided, in part, by the cylindrical lens 1040 being disposed at a 50 microns shift in the y-direction. In such a scenario, the second reflected light signal 256 could have a similar signal magnitude as compared to the first reflected light signal 252, but may be shifted by a shifted mirror angle 258 due to the cylindrical lens shift (e.g., misalignment) of approximately 50 microns in the y-direction. Other cylindrical lens shifts due to misalignments in other directions and orientations are possible and contemplated. In some embodiments, the shifted mirror angle 258 between the first reflected light signal 252 and the second reflected light signal 256 could be utilized to determine the y-direction misalignment of the cylindrical lens 1040. However, in some scenarios, the shifted mirror angle 258 could make it more difficult to determine the true shaft angle of the mirror assembly 130.

Figure 3A:
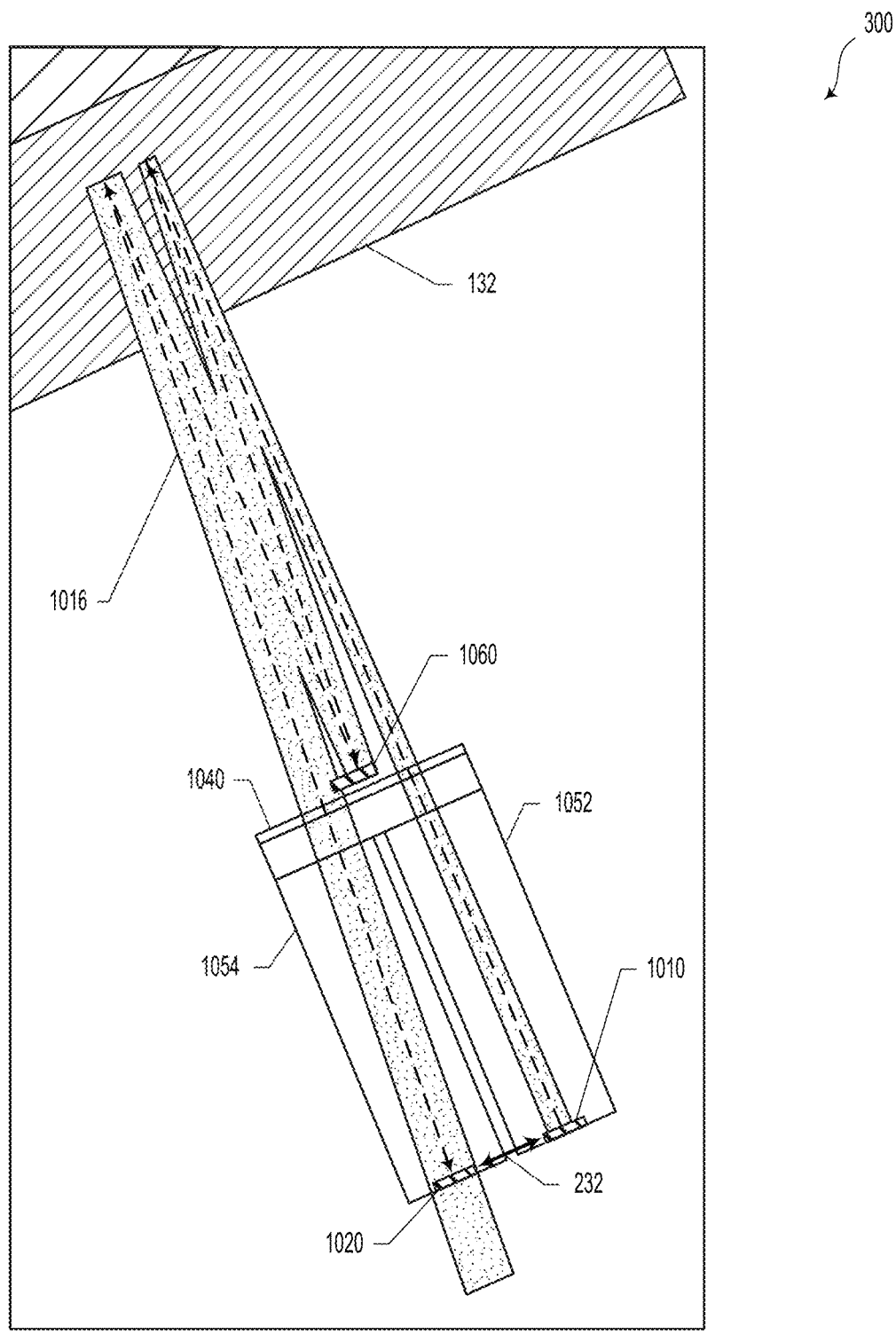
FIG. 3A illustrates a portion of the optical system of FIG. 1, according to an example embodiment.
Figure 3B:
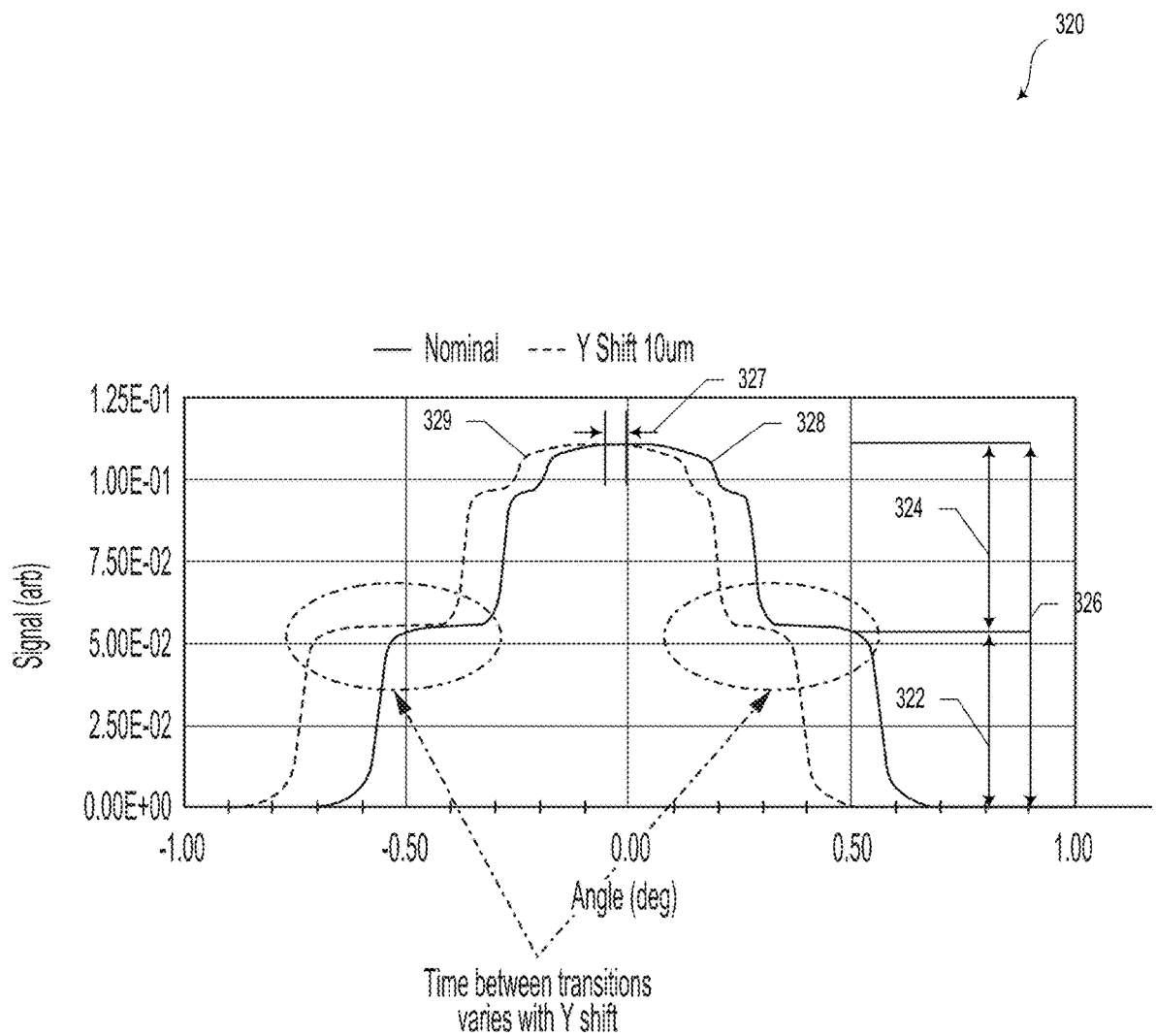
FIG. 3B illustrates reflected light signals, according to an example embodiment.
Figure 3C:
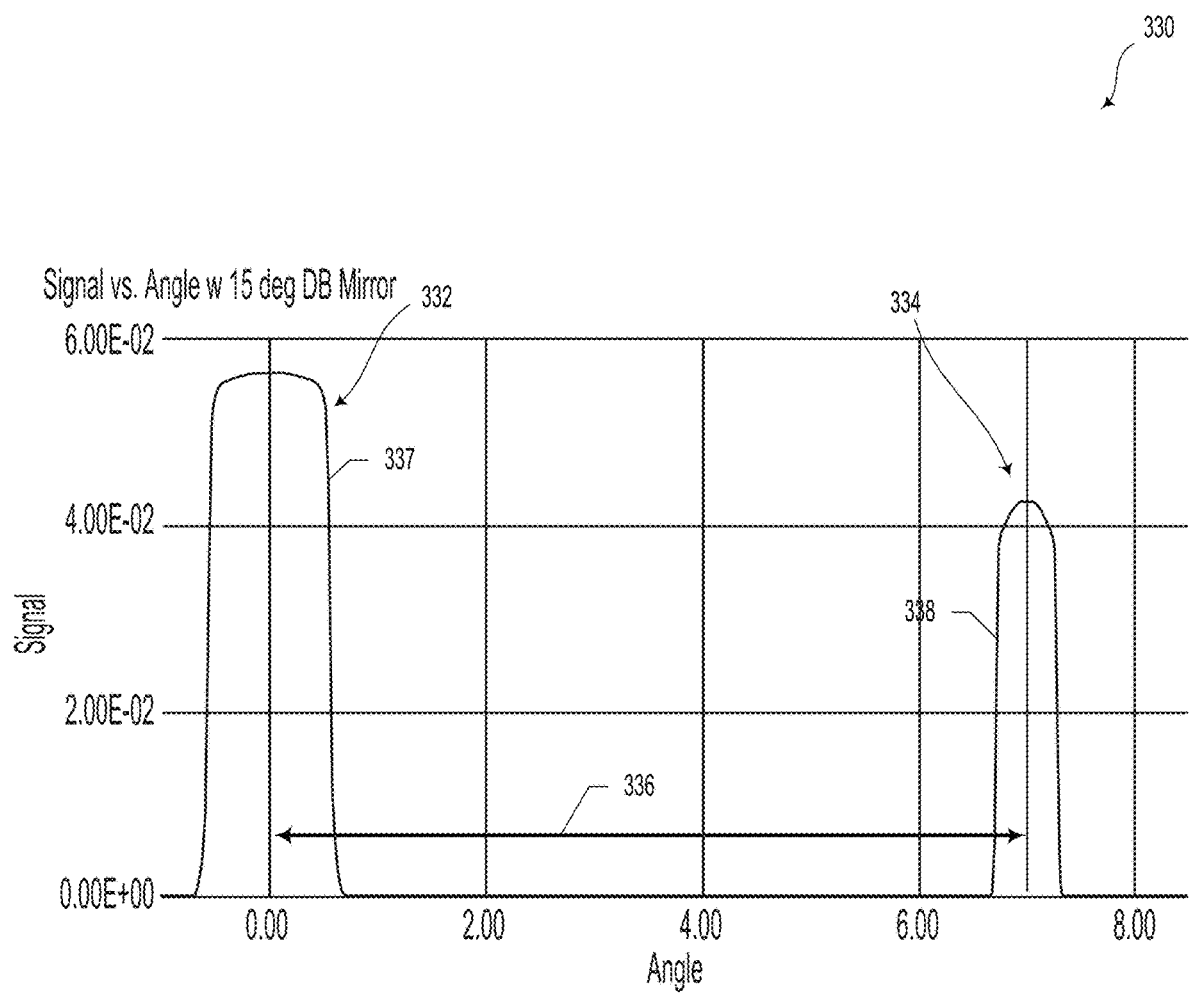
FIG. 3C illustrates reflected light signals, according to an example embodiment.

In an effort to avoid and/or reduce the effect of shifted mirror angle 258, the optical angle measurement module 1000 could beneficially utilize the secondary mirror surface 1060 as illustrated in FIGS. 3A, 3B, and 3C.

FIG. 3A illustrates a portion of the optical system 100 of FIG. 1, according to an example embodiment. The secondary reflection light 1016 could include a "triple bounce" of the emission light that include a first reflection off of the reflective surface 132, a second reflection off of the secondary mirror surface 1060, and a third reflection off of the reflective surface 132, which directs at least a portion of emission light toward the detector device 1020.

FIG. 3B illustrates reflected light signals 328 and 329, according to an example embodiment. Both reflected light signals 328 and 329 indicate a peak value 326, which corresponds to the detected primary light signal level and detected secondary light signal level. The shoulder value 322 corresponds to the primary light signal level. The difference between the peak value 326 and the shoulder value 322 could correspond to the secondary light signal level.

The angle offset 327 between the peak centers of reflected light signals 328 and 329 could be based on a 10 micron shift or offset of the cylindrical lens in the y-direction. However, other misalignments and corresponding angle offsets are possible and contemplated. As illustrated in FIG. 3B, the angle offset 327 of the central peaks could be less than reflected light signals based on only primary light signals (e.g., single bounce case described in reference to FIGS. 2C and 2E).

FIG. 3C illustrates scenario 330 that includes reflected light signals 337 and 338, according to an example embodiment. As described herein, the secondary mirror surface 1060 could be tilted at a tilt angle between 10 degrees to 20 degrees with respect to a plane perpendicular to the optical axis 1012. In such scenarios, the reflected light signal could include primary reflection peak 332 and a secondary reflection peak 334. Yet further, in such examples, determining the lens offset could be further based on a mean angle difference 336 between the primary reflection peak and the secondary reflection peak.

Figure 4:
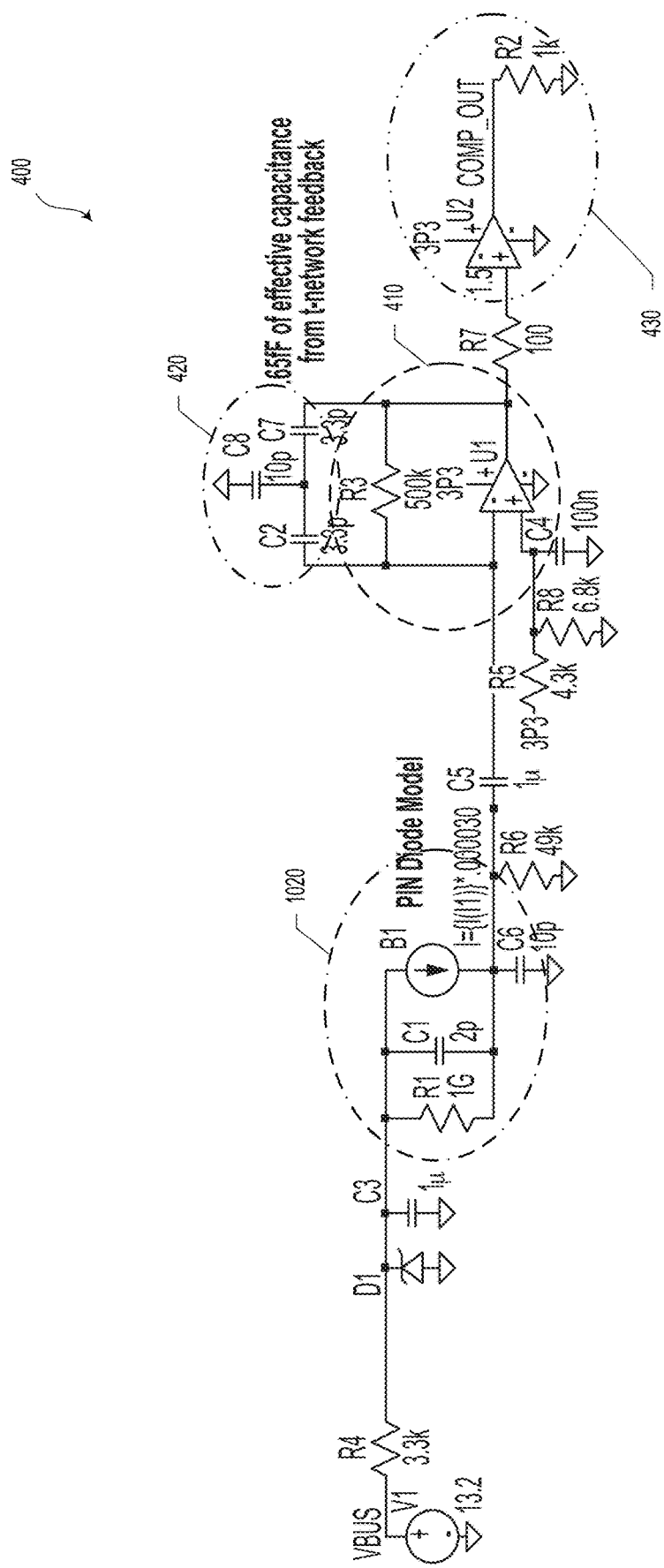
FIG. 4 illustrates a detector readout circuit, according to an example embodiment.
Figure 5A:
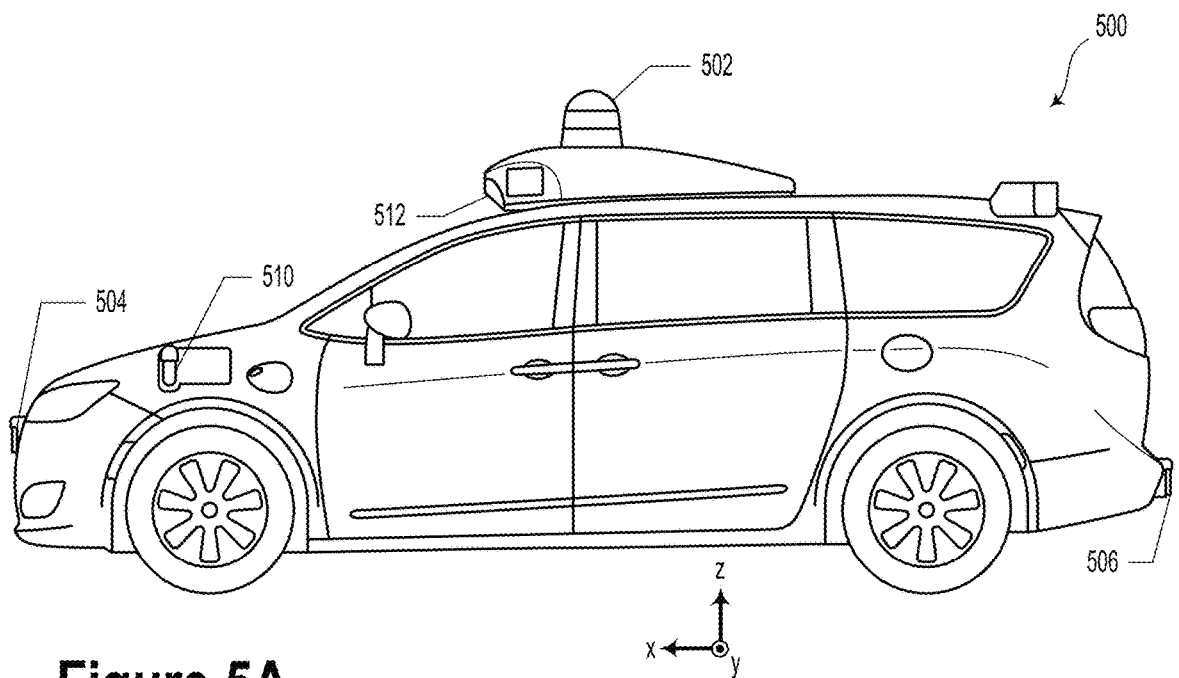
FIG. 5A illustrates a vehicle, according to an example embodiment.
Figure 5B:
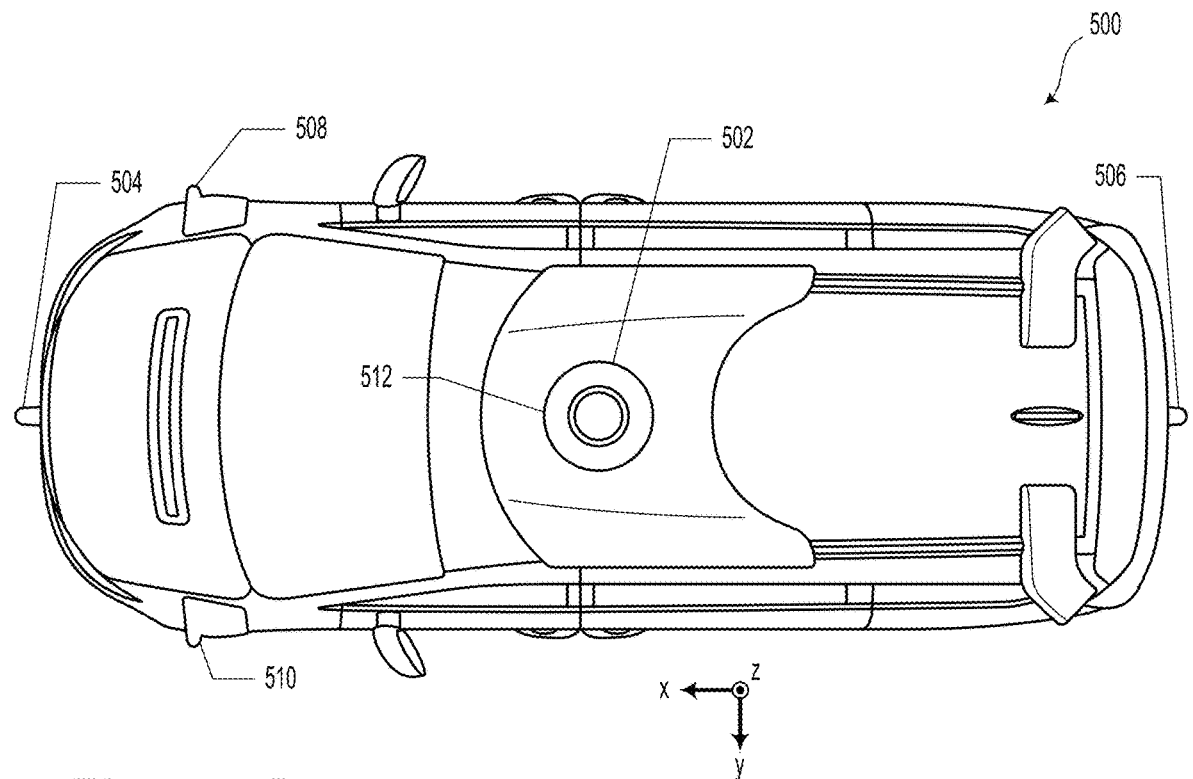
FIG. 5B illustrates a vehicle, according to an example embodiment.
Figure 5C:
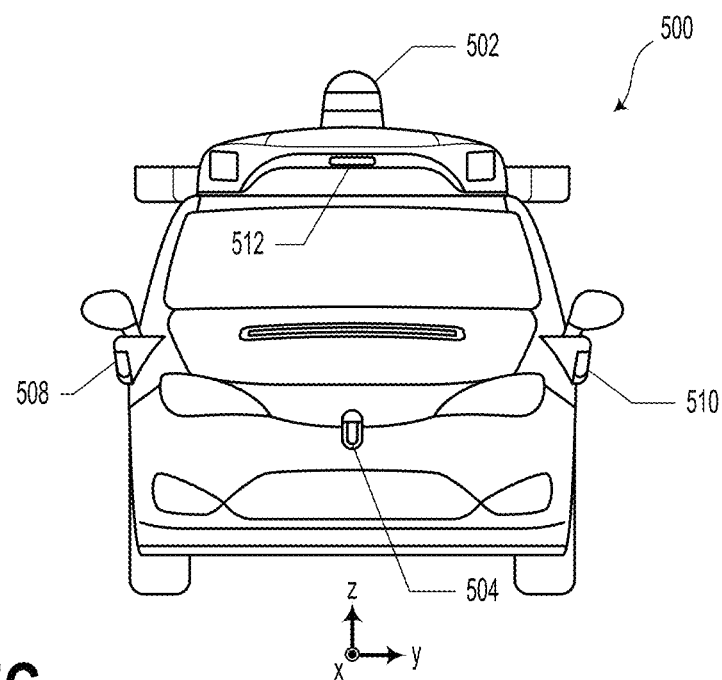
FIG. 5C illustrates a vehicle, according to an example embodiment.
Figure 5D:
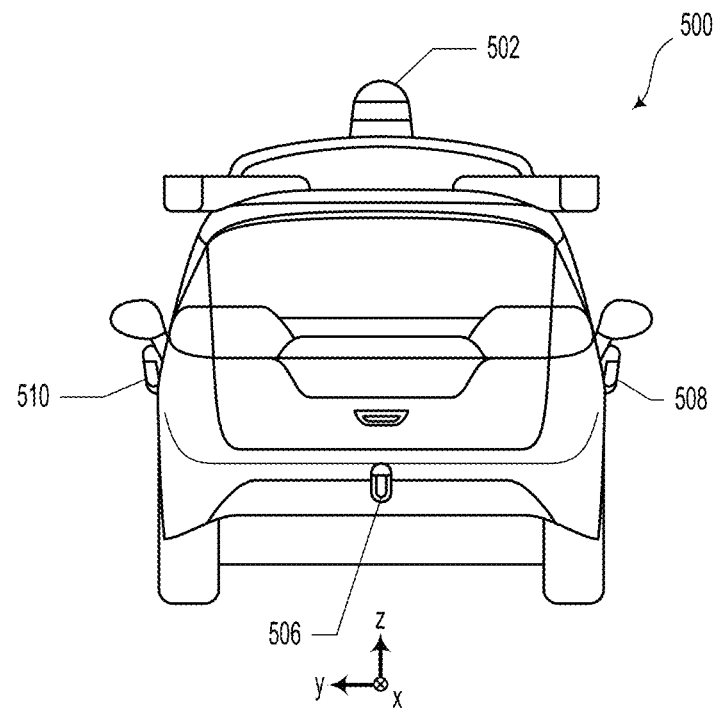
FIG. 5D illustrates a vehicle, according to an example embodiment.
Figure 5E:
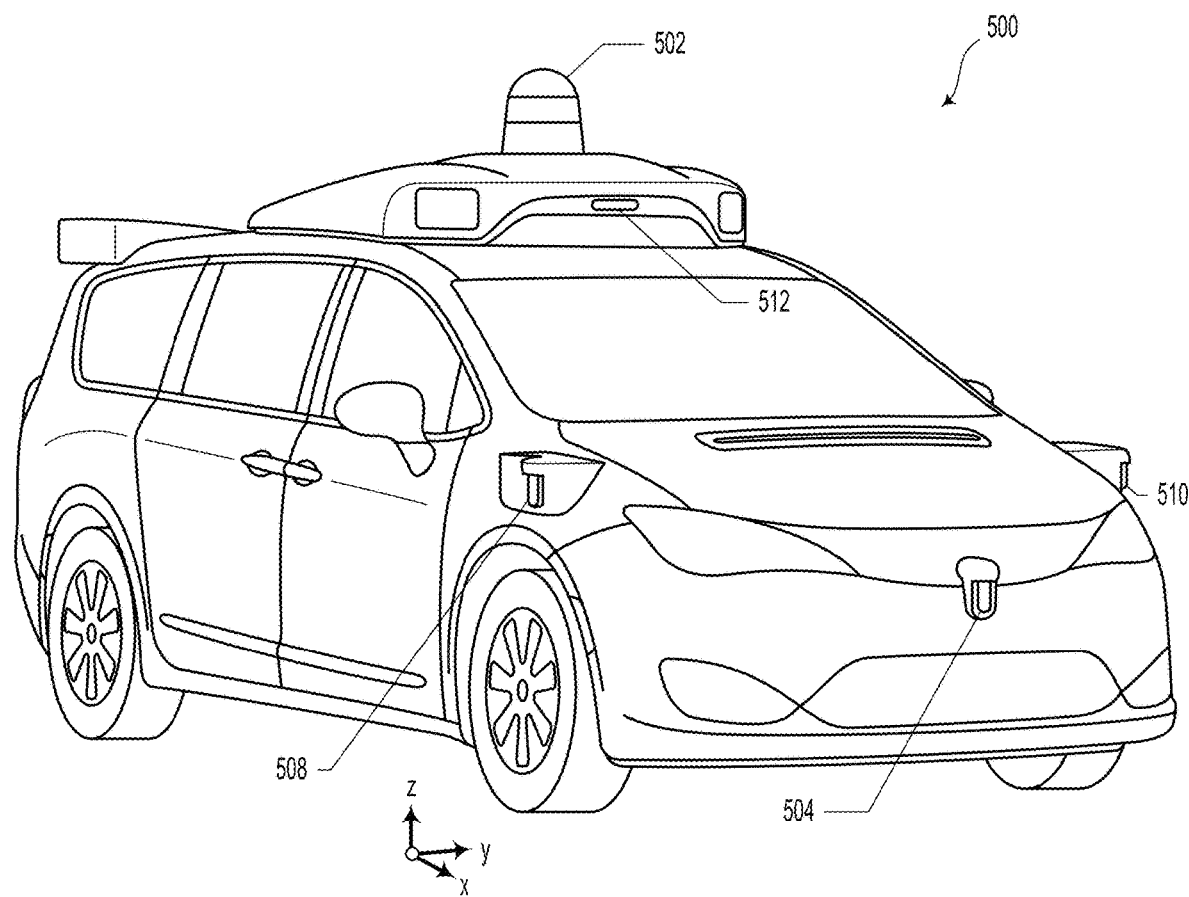
FIG. 5E illustrates a vehicle, according to an example embodiment.

FIG. 4 illustrates a detector readout circuit 400, according to an example embodiment. As described herein, the optical system 100 could include a detector readout circuit 400, which could include a transimpedance amplifier 410 with a capacitive feedback network 420 configured to convert a current pulse from the detector device 1020 into an analog signal, wherein the analog signal comprises a 1.5 volt peak-to-peak signal. Other peak-to-peak voltage values are possible and contemplated. The detector readout circuit 400 a digital comparator configured to provide a digital signal, wherein the digital signal comprises information indicative of rising and falling edges of the analog signal.

It will be understood that other configurations of the detector readout circuit 400 are possible and contemplated. For example, the detector readout circuit 400 could include two comparators, a first comparator for determining the rising and falling edges of the analog signal and a second comparator for determining a maximum value of the reflected light signals. In such scenarios, the maximum value of the waveform could be used to set the laser power emitted by the light-emitter device 1010 and/or set threshold(s) for the first comparator. Such a readout circuit could advantageously provide long term stability by sampling the reflected light signals in a consistent manner.

It will be understood that the detector readout circuit 400 could include other circuit elements and/or circuit configurations. It will be understood that other ways to provide an optical readout circuit to dynamically measure a light signal are possible and contemplated.

III. Example Vehicles

FIGS. 5A, 5B, 5C, 5D, and 5E illustrate a vehicle 500, according to an example embodiment. The vehicle 500 could be a semi- or fully-autonomous vehicle. While FIGS. 5A-5E illustrate vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In some embodiments, sensor systems 502, 504, 506, 508, and 510 could include LIDAR sensors having a plurality of light-emitter devices arranged over a range of angles with respect to a given plane (e.g., the x-y plane, the x-z plane, the y-z plane, etc.).

One or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

An example embodiment may include a system having a plurality of light-emitter devices. The system may include a transmit block of a lidar device. For example, the system may correspond to (or may be included in) a lidar device of a vehicle (e.g., a car, a truck, a motorcycle, a golf cart, an aerial vehicle, a boat, etc.). Each light-emitter device of the plurality of light-emitter devices is configured to emit light pulses along a respective beam elevation angle. The respective beam elevation angles could be based on a reference angle or reference plane. In some embodiments, the reference plane may be based on an axis of motion of the vehicle 500.

While lidar systems with single light-emitter devices are described and illustrated herein, lidar systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. Embodiments utilizing a plurality of fixed beams are also contemplated within the context of the present disclosure.

In some embodiments, a single light-emitter device may emit light pulses according to a variable shot schedule and/or with variable power per shot, as described herein. That is, emission power and/or timing of each laser pulse or shot may be based on a respective elevation angle of the shot. Furthermore, the variable shot schedule could be based on providing a desired vertical spacing at a given distance from the lidar system or from a surface (e.g., a front bumper) of a given vehicle supporting the lidar system. As an example, when the light pulses from the light-emitter device are directed downwards, the power-per-shot could be decreased due to a shorter anticipated maximum distance to target. Conversely, light pulses emitted by the light-emitter device at an elevation angle above a reference plane may have a relatively higher power-per-shot so as to provide sufficient signal-to-noise to adequately detect pulses that travel longer distances.

In some embodiments, the power/energy-per-shot could be controlled for each shot in a dynamic fashion. In other embodiments, the power/energy-per-shot could be controlled for successive set of several pulses (e.g., 10 light pulses). That is, the characteristics of the light pulse train could be changed on a per-pulse basis and/or a per-several-pulse basis.

While FIGS. 5A-5E illustrates various lidar sensors attached to the vehicle 500, it will be understood that the vehicle 500 could incorporate other types of sensors, such as a plurality of optical systems (e.g., cameras), radars, or ultrasonic sensors.

In an example embodiment, vehicle 500 could include a lidar system (e.g., system 100) configured to emit light pulses into an environment of the vehicle 500 so as to provide information indicative of objects within a default field of view. For example, vehicle 500 could include an optical system (e.g., optical system 100) having a rotatable base (e.g., rotatable base 110) configured to rotate about a first axis (e.g., first axis 102). The optical system could also include a mirror assembly (e.g., mirror assembly 130). The mirror assembly could be configured to rotate about a mirror rotation axis (e.g., mirror rotation axis 131). In some embodiments, the mirror rotation axis is substantially perpendicular to the first axis.

The optical system also includes an optical cavity (e.g., optical cavity 120) coupled to the rotatable base. In such scenarios, the optical cavity includes at least one light-emitter device (e.g., light-emitter device 126) and a light-emitter lens (e.g., light-emitter lens 128). The at least one light-emitter device and the light-emitter lens are arranged so as to define a light-emission axis (e.g., light-emission axis 18).

The optical system additionally includes a plurality of photodetectors (e.g., photodetectors 122. In an example embodiment, the plurality of photodetectors includes a respective set of two or more photodetectors for each light-emitter device of the at least one light-emitter device. The optical system also includes a photodetector lens (e.g., photodetector lens 124. In such scenarios, the plurality of photodetectors and the photodetector lens are arranged so as to define a light-receiving axis (e.g., light-receiving axis 19).

In some embodiments, each set of two or more photodetectors could include a primary light detector (e.g., primary light detector 123) and a secondary light detector (e.g., secondary light detector 125). In such scenarios, the primary light detector is configured to receive a first portion of return light emitted from a given light-emitter device. Furthermore, the secondary light detector is configured to receive a second portion of return light emitted from the given light-emitter device.

In some embodiments, the first portion of the return light is at least an order of magnitude greater in photon flux than the second portion of the return light.

IV. Example Methods

Figure 6:
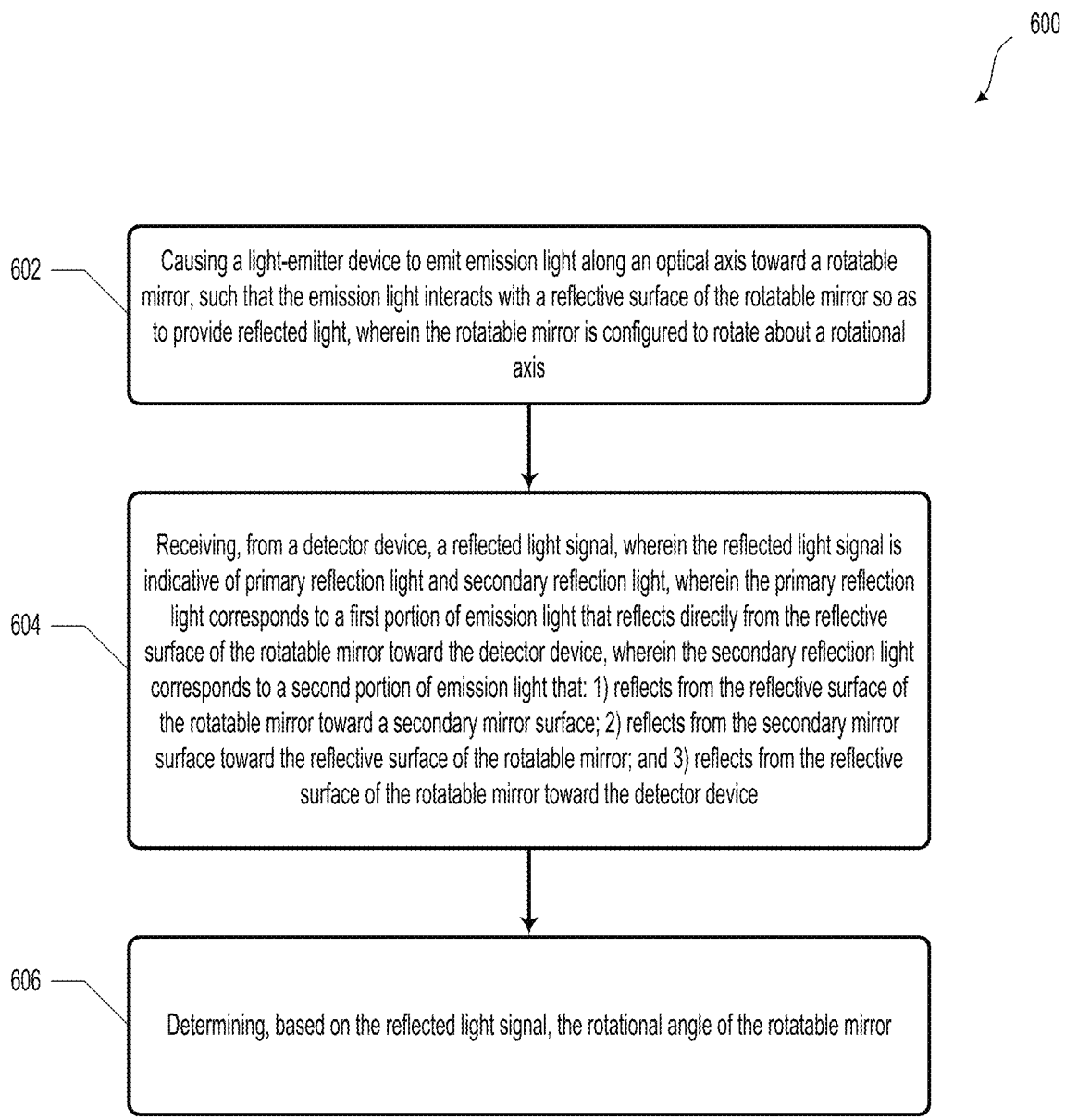
FIG. 6 illustrates a method, according to an example embodiment.

FIG. 6 illustrates a method 600, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may be carried out by controller 150 and/or other elements of optical system 100 as illustrated and described in relation to FIGS. 1, 2A, 2B, 2C, 3A, and 4.

Block 602 includes causing a light-emitter device (e.g., light-emitter device 1010) to emit emission light along an optical axis (e.g., optical axis 1012) toward a rotatable mirror (e.g., mirror assembly 130), such that the emission light interacts with a reflective surface (e.g., reflective surface(s) 132) of the rotatable mirror so as to provide reflected light (e.g., primary reflected light 1014 and/or secondary reflected light 1016). The rotatable mirror is configured to rotate about a rotational axis (e.g., mirror rotation axis 132).

Block 604 includes receiving, from a detector device (e.g., detector device 1020), a reflected light signal. The reflected light signal (e.g., reflected light signal 328) is indicative of primary reflection light and secondary reflection light, wherein the primary reflection light (e.g., primary reflection light 1014) corresponds to a first portion of emission light that reflects directly from the reflective surface of the rotatable mirror toward the detector device. The secondary reflection light (e.g., secondary reflection light 1016) corresponds to a second portion of emission light that: 1) reflects from the reflective surface of the rotatable mirror toward a secondary mirror surface (e.g., secondary mirror surface 1060); 2) reflects from the secondary mirror surface toward the reflective surface of the rotatable mirror; and 3) reflects from the reflective surface of the rotatable mirror toward the detector device.

Block 606 includes determining, based on the reflected light signal, a rotational angle of the rotatable mirror.

In some embodiments, method 600 could include determining, based on the reflected light signal, a lens offset (e.g., angle offset 327). In such scenarios, determining the rotational angle of the rotatable mirror is further based on the lens offset.

In various examples, method 600 may additionally or alternatively include receiving, from a magnetic encoder (e.g., magnetic encoder 139), a magnetic encoder angle corresponding to the rotatable mirror.

Method 600 may also include comparing the magnetic encoder angle to the rotational angle and based on the comparison, performing at least one of: averaging the magnetic encoder angle and the rotational angle so as to provide a corrected rotational angle or determining an angle measurement fault. In some embodiments, averaging the magnetic encoder angle and the rotational angle could be combined and/or filter using a Kalman filter.

In some embodiments, method 600 may include causing the rotatable mirror to rotate about the rotational axis at a rotational rate. As an example, causing the rotatable mirror to rotate could include causing a mirror actuator (e.g., mirror actuator 136) to rotate the rotatable mirror by way of a shaft (e.g., shaft 134) at the rotational rate. In such scenarios, the method 600 could additionally include adjusting the rotational rate of the rotatable mirror based on the corrected rotational angle, the angle measurement fault, and/or the determined rotational angle of the rotatable mirror. In some embodiments, the method could include using the magnetic encoder to monitor the motion of the rotatable mirror throughout its rotation. In such scenarios, the method may additionally include using the rotational angle of the rotatable mirror determined in block 606 to compensate for drift in the magnetic encoder. Such embodiments may advantageously utilize the high temporal resolution of the magnetic encoder while providing improved absolute angle accuracy and long term stability of the optical encoder system and method.

In various examples, systems and methods described herein could utilize optical angle information received from one or more optical angle encoders (e.g., optical angle measurement module 1000) along with magnetic angle information received from one or more magnetic angle encoders (e.g., magnetic encoder 139). For example, the optical angle information could be combined with the magnetic angle information. In such scenarios, the optical angle encoder could provide periodic highly accurate updates (e.g., one update per mirror face which further needs some averaging to eliminate noise) and the magnetic encoder could provide more-frequent updates that have a gradually-drifting zero offset. In some examples, the optical angle information and/or the magnetic angle information could be averaged or otherwise filtered to reduce or eliminate noise. The optical angle information and the magnetic angle information could be combined using a Kalman filter. In such a scenario, the combined optical and magnetic angle information could provide a combined angle signal that could provide high temporal resolution as well as high angular accuracy.

Various systems and methods described herein could include ways to adjust various aspects of the optical system so as to dynamically optimize or improve its performance.

First, a comparator threshold could be toggled between a lower threshold level and a higher threshold level. In such scenarios, the comparator threshold could be adjusted to a low threshold level so that the peak of the incident pulse is just above a predetermined threshold level. In doing so, the peak position of the incident pulse could be adjustably characterized. In some examples, the comparator threshold level could be increased or decreased to more accurately determine the width of the pulse. In some embodiments, two or more comparator threshold levels could be utilized so as to 1) provide information about an emission power of the light-emitter device; and 2) obtain an accurate measurement of the optical signal.

Second, the emission power could be adjusted based on a desired temporal width of the received light pulse. For example, the emission power could be adjusted so as to maintain a similar temporal width between subsequent emission light pulses. In such scenarios, the emission power voltage provided to the light-emitter device could be utilized to provide a proxy for the emission pulse peak value. Additionally or alternatively, dynamically adjusting the emission power could maintain the pulse width over a narrow range, which may improve angular accuracy.

In some examples, methods and systems could include determining temporal information about, for example, the exact time at which the mirror surface of the rotatable mirror rotated past the optical encoder. For example, the precise time could be determined by taking the average or some other weighted mean of the rising and falling edge time. In some embodiments, the average of the rise and fall edge time provided good invariance to threshold level and to emission power.

The arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system comprising:
a rotatable mirror, wherein the rotatable mirror is configured to rotate about a rotational axis;
a substrate;
a light-emitter device configured to emit emission light along an optical axis, such that the emission light interacts with a reflective surface of the rotatable mirror to provide reflected light;
a detector device, wherein the light-emitter device and the detector device are disposed along the substrate, wherein the detector device is configured to receive at least a portion of the reflected light;
a cylindrical lens, wherein the light-emitter device and the detector device are optically coupled to the rotatable mirror by way of the cylindrical lens, and wherein the detector device is configured to provide a reflected light signal indicative of a rotational angle of the rotatable mirror with respect to the rotational axis; and
a detector readout circuit, wherein the detector readout circuit comprises:
a transimpedance amplifier with a capacitive feedback network configured to convert a current pulse from the detector device into an analog signal; and
a digital comparator configured to provide a digital signal, wherein the digital signal comprises information indicative of rising and falling edges of the analog signal.

2. The optical system of claim 1, wherein the cylindrical lens comprises a radius of curvature of between 1.5 mm to 2.5 mm, wherein the cylindrical lens is formed from polycarbonate.

3. The optical system of claim 1, wherein the light-emitter device comprises a single mode vertical cavity surface emitting laser (VCSEL).

4. The optical system of claim 1, wherein the detector device comprises a silicon PIN photodiode.

5. The optical system of claim 1, wherein the light-emitter device and the detector device are separated along the substrate by a separation distance between 0.8 mm to 1.5 mm.

6. The optical system of claim 1, wherein the cylindrical lens is configured to collimate the emission light and the reflected light.

7. The optical system of claim 1, wherein the rotational angle corresponds to an orientation of the rotatable mirror such that the reflective surface of the rotatable mirror is perpendicular to the optical axis.

8. The optical system of claim 1, wherein the rotatable mirror comprises a plurality of reflective surfaces, wherein the rotatable mirror has a triangular prism shape or a rectangular prism shape.

9. The optical system of claim 1, further comprising:
a spacer, wherein the spacer comprises a light-emitter cavity and a detector cavity, wherein the spacer is coupled to the substrate and the cylindrical lens.

10. The optical system of claim 9, wherein the spacer comprises a rectangular cavity with openings along a first surface of the spacer and an opposing second surface of the spacer.

11. The optical system of claim 1, wherein the reflected light comprises primary reflection light, wherein the primary reflection light corresponds to a first portion of emission light that reflects directly from the reflective surface of the rotatable mirror toward the detector device.

12. The optical system of claim 11, further comprising a secondary mirror surface disposed on the cylindrical lens, wherein the reflected light further comprises secondary reflection light, wherein the secondary reflection light corresponds to a second portion of emission light that: 1) reflects from the reflective surface of the rotatable mirror toward the secondary mirror surface; 2) reflects from the secondary mirror surface toward the reflective surface of the rotatable mirror; and 3) reflects from the reflective surface of the rotatable mirror toward the detector device.

13. The optical system of claim 12, further comprising:
a controller having a processor and at least one memory, wherein the processor executes instructions stored in the at least one memory so as to carry out operations, the operations comprising:
receiving, from the detector device, the reflected light signal, wherein the reflected light signal is indicative of the primary reflection light and the secondary reflection light; and determining, based on the reflected light signal, the rotational angle of the rotatable mirror.

14. The optical system of claim 13, wherein the operations further comprise:
determining, based on the reflected light signal, a lens offset, wherein determining the rotational angle of the rotatable mirror is further based on the lens offset.

15. The optical system of claim 14, wherein the secondary mirror surface is tilted at a tilt angle between 10 degrees to 20 degrees with respect to a plane perpendicular to the optical axis such that the reflected light signal comprises a primary reflection peak and a secondary reflection peak, and wherein determining the lens offset is further based on a mean angle difference between the primary reflection peak and the secondary reflection peak.

16. The optical system of claim 13, wherein the operations further comprise:
receiving, from an angle encoder, an encoder angle corresponding to the rotatable mirror;
comparing the encoder angle to the rotational angle; and
based on the comparison, performing at least one of:
averaging the encoder angle and the rotational angle so as to provide a corrected rotational angle; or
determining an angle measurement fault.

17. The optical system of claim 1, wherein the analog signal comprises a 1.5 volt peak-to-peak signal.

18. A method comprising:
causing a light-emitter device to emit emission light along an optical axis toward a rotatable mirror, such that the emission light interacts with a reflective surface of the rotatable mirror to provide reflected light, wherein the rotatable mirror is configured to rotate about a rotational axis;
receiving, from a detector device, a reflected light signal, wherein the reflected light signal is indicative of primary reflection light and secondary reflection light, wherein the primary reflection light corresponds to a first portion of emission light that reflects directly from the reflective surface of the rotatable mirror toward the detector device, wherein the secondary reflection light corresponds to a second portion of emission light that: 1) reflects from the reflective surface of the rotatable mirror toward a secondary mirror surface; 2) reflects from the secondary mirror surface toward the reflective surface of the rotatable mirror; and 3) reflects from the reflective surface of the rotatable mirror toward the detector device; and
determining, by a detector readout circuit and based on the reflected light signal, a rotational angle of the rotatable mirror, wherein determining the rotational angle of the rotatable mirror comprises:
converting, by a transimpedance amplifier with a capacitive feedback network, a current pulse from the detector device into an analog signal; and
providing, by a digital comparator, a digital signal comprising information indicative of rising and falling edges of the analog signal.

19. The method of claim 18, further comprising:
determining, based on the reflected light signal, a lens offset, wherein determining the rotational angle of the rotatable mirror is further based on the lens offset.

20. The method of claim 18, further comprising:
receiving, from an angle encoder, an encoder angle corresponding to the rotatable mirror;
comparing the encoder angle to the rotational angle; and
based on the comparison, performing at least one of:
averaging the encoder angle and the rotational angle so as to provide a corrected rotational angle; or
determining an angle measurement fault.

* * * * *